(12) United States Patent
Esser

(10) Patent No.: US 12,071,074 B2
(45) Date of Patent: Aug. 27, 2024

(54) EXTERIOR REARVIEW MIRROR ASSEMBLY

(71) Applicant: MAGNA MIRRORS OF AMERICA, INC., Holland, MI (US)

(72) Inventor: Robert L. Esser, Rockford, MI (US)

(73) Assignee: MAGNA MIRRORS OF AMERICA, INC., Holland, MI (US)

(*) Notice: Subject to any disclaimer, the term of this patent is extended or adjusted under 35 U.S.C. 154(b) by 0 days.

(21) Appl. No.: 18/297,722

(22) Filed: Apr. 10, 2023

(65) Prior Publication Data

US 2023/0242036 A1     Aug. 3, 2023

Related U.S. Application Data

(60) Division of application No. 17/663,228, filed on May 13, 2022, now Pat. No. 11,623,568, which is a
(Continued)

(51) Int. Cl.
*B60R 1/07*      (2006.01)
*B60R 1/074*     (2006.01)
(Continued)

(52) U.S. Cl.
CPC ............... *B60R 1/07* (2013.01); *B60R 1/074* (2013.01); *G02B 7/182* (2013.01); *F16M 11/126* (2013.01); *F16M 11/18* (2013.01)

(58) Field of Classification Search
CPC .......... B60R 1/07; B60R 1/072; B60R 1/074; G02B 7/182; G02B 5/08; G02B 27/0006
(Continued)

(56) References Cited

U.S. PATENT DOCUMENTS

| 1,114,559 A | 10/1914 | Weed |
| 2,307,568 A | 1/1943 | Colbert |

(Continued)

FOREIGN PATENT DOCUMENTS

| CN | 1129428 A | 8/1996 |
| CN | 1367881 A | 9/2002 |

(Continued)

OTHER PUBLICATIONS

International Search Report and Written Opinion dated Aug. 2, 2019 from corresponding PCT Application No. PCT/US2019/032340.
(Continued)

*Primary Examiner* — Ricky D Shafer
(74) *Attorney, Agent, or Firm* — HONIGMAN LLP

(57) ABSTRACT

A vehicular exterior rearview mirror assembly includes a mounting arm and a mirror head having a mirror reflective element. An electrically-operated actuator includes a first attachment element that attaches at an actuator-mounting bracket of the mounting arm and a second attachment element that attaches at the mirror head. The actuator is electrically operated to cause adjustment of the mirror head relative to the mounting arm about first and second pivot axes. A mounting post of the mounting arm passes through an opening of the mirror head, the opening providing clearance between the mirror head and the mounting arm to allow movement of the mirror head relative to the mounting arm during electrical operation of the actuator when the base mounting portion of the vehicular exterior rearview mirror assembly is mounted at the exterior portion of the side door of the equipped vehicle.

27 Claims, 17 Drawing Sheets

Related U.S. Application Data continuation of application No. 17/250,066, filed as application No. PCT/US2019/032340 on May 15, 2019, now Pat. No. 11,351,919.

(60) Provisional application No. 62/675,912, filed on May 24, 2018.

(51) Int. Cl.
  *G02B 7/182* (2021.01)
  *F16M 11/12* (2006.01)
  *F16M 11/18* (2006.01)

(58) Field of Classification Search
  USPC .................................. 359/841, 872, 877
  See application file for complete search history.

(56) References Cited

U.S. PATENT DOCUMENTS

| | | | |
|---|---|---|---|
| 2,552,074 | A | 5/1951 | Thompson |
| 2,839,965 | A | 6/1958 | Budreck |
| 2,969,715 | A | 1/1961 | Mosby |
| 3,119,591 | A | 1/1964 | Malecki |
| 3,229,581 | A * | 1/1966 | Walter ............... B60R 1/064 74/504 |
| 3,407,684 | A | 10/1968 | Van Noord |
| 3,459,470 | A | 8/1969 | Hahn |
| 3,549,243 | A | 12/1970 | Horwitt et al. |
| 3,575,496 | A | 4/1971 | Pollock et al. |
| 3,628,862 | A | 12/1971 | Stephenson |
| 3,711,179 | A | 1/1973 | Takeda |
| 4,470,323 | A | 9/1984 | Manzoni |
| 4,477,149 | A | 10/1984 | Crespy |
| 4,512,633 | A | 4/1985 | Manzoni |
| 4,540,252 | A | 9/1985 | Hayashi et al. |
| 4,558,930 | A | 12/1985 | Deedreek |
| 4,699,024 | A | 10/1987 | Iida et al. |
| 4,712,879 | A | 12/1987 | Lynam et al. |
| 4,826,289 | A | 5/1989 | Vandenbrink et al. |
| 4,832,477 | A | 5/1989 | Torii et al. |
| 4,936,670 | A | 6/1990 | Yoo |
| 4,940,321 | A | 7/1990 | Yoshida |
| 4,991,950 | A | 2/1991 | Lang et al. |
| 5,005,797 | A | 4/1991 | Maekawa et al. |
| 5,073,012 | A | 12/1991 | Lynam |
| 5,076,673 | A | 12/1991 | Lynam et al. |
| 5,117,346 | A | 5/1992 | Gard |
| 5,140,455 | A | 8/1992 | Varaprasad et al. |
| 5,142,407 | A | 8/1992 | Varaprasad et al. |
| 5,151,816 | A | 9/1992 | Varaprasad et al. |
| 5,190,499 | A | 3/1993 | Mori et al. |
| 5,210,651 | A | 5/1993 | Shibuya et al. |
| 5,253,109 | A | 10/1993 | O'Farrell et al. |
| 5,343,333 | A | 8/1994 | Nagayama et al. |
| 5,371,659 | A | 12/1994 | Pastrick et al. |
| 5,406,414 | A | 4/1995 | O'Farrell et al. |
| 5,424,898 | A | 6/1995 | Larson et al. |
| 5,473,476 | A | 12/1995 | Fujita |
| 5,477,390 | A | 12/1995 | Boddy et al. |
| 5,489,080 | A | 2/1996 | Allen |
| 5,497,306 | A | 3/1996 | Pastrick |
| 5,513,048 | A | 4/1996 | Chen |
| 5,525,264 | A | 6/1996 | Cronin et al. |
| 5,546,239 | A | 8/1996 | Lewis |
| 5,567,360 | A | 10/1996 | Varaprasad et al. |
| 5,572,376 | A | 11/1996 | Pace |
| 5,579,178 | A | 11/1996 | Mochizuki |
| 5,610,756 | A | 3/1997 | Lynam et al. |
| 5,624,176 | A | 4/1997 | O'Farrell et al. |
| 5,659,423 | A | 8/1997 | Schierbeek et al. |
| 5,668,663 | A | 9/1997 | Varaprasad et al. |
| 5,669,699 | A | 9/1997 | Pastrick et al. |
| 5,703,731 | A | 12/1997 | Boddy et al. |
| 5,724,187 | A | 3/1998 | Varaprasad et al. |
| 5,786,772 | A | 7/1998 | Schofield et al. |
| 5,796,176 | A | 8/1998 | Kramer et al. |
| 5,823,654 | A | 10/1998 | Pastrick et al. |
| 5,864,435 | A | 1/1999 | Toyama |
| 5,900,999 | A | 5/1999 | Huizenga et al. |
| 5,903,402 | A | 5/1999 | Hoek |
| 5,910,854 | A | 6/1999 | Varaprasad et al. |
| 5,929,786 | A | 7/1999 | Schofield et al. |
| 5,949,591 | A | 9/1999 | Whitehead |
| 5,969,890 | A | 10/1999 | Whitehead |
| 5,986,364 | A | 11/1999 | Bingle et al. |
| 6,002,544 | A | 12/1999 | Yatsu |
| 6,146,003 | A | 11/2000 | Thau |
| 6,154,306 | A | 11/2000 | Varaprasad et al. |
| 6,170,957 | B1 | 1/2001 | Kaspar |
| 6,176,602 | B1 | 1/2001 | Pastrick et al. |
| 6,178,034 | B1 | 1/2001 | Allemand et al. |
| 6,198,409 | B1 | 3/2001 | Schofield et al. |
| 6,213,612 | B1 | 4/2001 | Schnell et al. |
| 6,227,689 | B1 | 5/2001 | Miller |
| 6,229,226 | B1 | 5/2001 | Kramer et al. |
| 6,239,928 | B1 | 5/2001 | Whitehead et al. |
| 6,243,218 | B1 | 6/2001 | Whitehead |
| 6,270,227 | B1 | 8/2001 | Tsuyama |
| 6,276,821 | B1 | 8/2001 | Pastrick et al. |
| 6,312,135 | B1 | 11/2001 | Polzer |
| 6,325,518 | B1 | 12/2001 | Whitehead et al. |
| 6,362,548 | B1 | 3/2002 | Bingle et al. |
| 6,420,036 | B1 | 7/2002 | Varaprasad et al. |
| 6,439,755 | B1 | 8/2002 | Fant, Jr. et al. |
| 6,467,920 | B2 | 10/2002 | Schnell et al. |
| 6,481,878 | B2 | 11/2002 | Thau |
| 6,501,387 | B2 | 12/2002 | Skiver et al. |
| 6,522,451 | B1 | 2/2003 | Lynam |
| 6,582,109 | B2 | 6/2003 | Miller |
| 6,672,731 | B2 | 1/2004 | Schnell et al. |
| 6,682,200 | B2 | 1/2004 | Tsuyama et al. |
| 6,685,864 | B2 | 2/2004 | Bingle et al. |
| 6,690,268 | B2 | 2/2004 | Schofield et al. |
| 6,698,905 | B1 | 3/2004 | Whitehead |
| 6,717,712 | B2 | 4/2004 | Lynam et al. |
| 6,755,544 | B2 | 6/2004 | Schnell et al. |
| 6,847,288 | B1 | 1/2005 | Baschnagel, III |
| 6,871,970 | B2 | 3/2005 | Georges |
| 6,882,287 | B2 | 4/2005 | Schofield |
| 6,916,100 | B2 | 7/2005 | Pavao |
| 6,932,497 | B1 | 8/2005 | Huang |
| 7,035,678 | B2 | 4/2006 | Lynam et al. |
| 7,038,577 | B2 | 5/2006 | Pawlicki et al. |
| 7,070,287 | B2 | 7/2006 | Foote et al. |
| 7,073,914 | B2 | 7/2006 | Pavao |
| 7,080,914 | B1 | 7/2006 | Boddy |
| 7,093,946 | B2 | 8/2006 | Barve et al. |
| 7,104,663 | B2 | 9/2006 | Whitehead |
| 7,126,456 | B2 | 10/2006 | Boddy et al. |
| 7,159,992 | B2 | 1/2007 | Foote |
| 7,178,925 | B1 | 2/2007 | Tidwell |
| 7,184,190 | B2 | 2/2007 | McCabe et al. |
| 7,195,381 | B2 | 3/2007 | Lynam et al. |
| 7,224,324 | B2 | 5/2007 | Quist et al. |
| 7,249,860 | B2 | 7/2007 | Kulas et al. |
| 7,253,723 | B2 | 8/2007 | Lindahl et al. |
| 7,255,451 | B2 | 8/2007 | McCabe et al. |
| 7,267,449 | B1 | 9/2007 | Boddy et al. |
| 7,274,501 | B2 | 9/2007 | McCabe et al. |
| 7,287,867 | B2 | 10/2007 | Wellington et al. |
| 7,289,037 | B2 | 10/2007 | Uken et al. |
| 7,314,285 | B2 | 1/2008 | Ruse et al. |
| 7,322,710 | B2 | 1/2008 | Foote et al. |
| 7,338,177 | B2 | 3/2008 | Lynam |
| 7,360,932 | B2 | 4/2008 | Uken et al. |
| 7,370,985 | B2 | 5/2008 | Boddy et al. |
| 7,492,281 | B2 | 2/2009 | Lynam et al. |
| 7,581,859 | B2 | 9/2009 | Lynam |
| 7,626,749 | B2 | 12/2009 | Baur et al. |
| 7,720,580 | B2 | 5/2010 | Higgins-Luthman |
| 7,722,199 | B2 | 5/2010 | DeWard et al. |
| 7,748,856 | B2 | 7/2010 | Zhao |
| 7,777,611 | B2 | 8/2010 | Desai |
| 7,944,371 | B2 | 5/2011 | Foote et al. |

(56) References Cited

U.S. PATENT DOCUMENTS

| | | |
|---|---|---|
| 8,049,640 B2 | 11/2011 | Uken et al. |
| 8,154,418 B2 | 4/2012 | Peterson et al. |
| 8,262,240 B2 | 9/2012 | Negel |
| 8,508,831 B2 | 8/2013 | De Wind et al. |
| 8,529,108 B2 | 9/2013 | Uken et al. |
| 8,730,553 B2 | 5/2014 | De Wind et al. |
| 8,764,256 B2 | 7/2014 | Foote et al. |
| 8,915,601 B2 | 12/2014 | Foote et al. |
| 9,067,541 B2 | 6/2015 | Sobecki et al. |
| 9,174,578 B2 | 11/2015 | Uken et al. |
| 9,346,403 B2 | 5/2016 | Uken et al. |
| 9,487,142 B2 | 11/2016 | Sobecki et al. |
| 9,598,016 B2 | 3/2017 | Blank et al. |
| 9,827,913 B2 | 11/2017 | De Wind et al. |
| 9,969,334 B2 | 5/2018 | De Wind et al. |
| 10,099,618 B2 | 10/2018 | Foote et al. |
| 10,261,648 B2 | 4/2019 | Uken et al. |
| 10,358,092 B2 * | 7/2019 | Brouwer ............... B60R 1/074 |
| 10,759,345 B2 * | 9/2020 | Lettis .................... B60R 1/066 |
| 11,148,596 B2 | 10/2021 | Huizen et al. |
| 11,351,919 B2 | 6/2022 | Esser |
| 11,370,359 B2 * | 6/2022 | Lettis .................... B60R 1/1207 |
| 11,485,289 B2 * | 11/2022 | Baur ....................... B60R 1/072 |
| 11,623,568 B2 | 4/2023 | Esser |
| 11,634,076 B2 * | 4/2023 | Peterson ................. B60R 1/074 |
| | | 359/841 |
| 11,691,567 B2 * | 7/2023 | Huizen .................... B60R 1/12 |
| | | 359/841 |
| 2001/0015862 A1 | 8/2001 | Lynam et al. |
| 2002/0063978 A1 | 5/2002 | Guttenberger et al. |
| 2002/0141085 A1 | 10/2002 | Whitehead et al. |
| 2003/0001301 A1 | 1/2003 | Duroux et al. |
| 2004/0196578 A1 | 10/2004 | Dumont et al. |
| 2006/0050018 A1 | 3/2006 | Hutzel et al. |
| 2006/0061008 A1 | 3/2006 | Karner et al. |
| 2007/0002477 A1 | 1/2007 | Whitehead |
| 2007/0285812 A1 | 12/2007 | Foote et al. |
| 2008/0043354 A1 | 2/2008 | Fukai et al. |
| 2009/0040306 A1 | 2/2009 | Foote et al. |
| 2009/0161379 A1 | 6/2009 | Liesener |
| 2009/0251785 A1 | 10/2009 | Bruhnke et al. |
| 2009/0251913 A1 | 10/2009 | Bruhnke et al. |
| 2009/0279195 A1 * | 11/2009 | Itoh ........................ B60R 1/074 |
| | | 359/872 |
| 2010/0067131 A1 | 3/2010 | Negel |
| 2010/0182143 A1 | 7/2010 | Lynam |
| 2010/0238570 A1 | 9/2010 | Reedman et al. |
| 2010/0321758 A1 | 12/2010 | Bugno et al. |
| 2011/0194203 A1 | 8/2011 | Foote et al. |
| 2012/0026571 A1 | 2/2012 | Uken et al. |
| 2012/0038964 A1 | 2/2012 | De Wind et al. |
| 2012/0236388 A1 | 9/2012 | De Wind et al. |
| 2014/0022390 A1 | 1/2014 | Blank et al. |
| 2014/0133044 A1 | 5/2014 | Mambourg |
| 2014/0285666 A1 | 9/2014 | O'Connell et al. |
| 2014/0293169 A1 | 10/2014 | Uken et al. |
| 2014/0313563 A1 | 10/2014 | Uken et al. |
| 2015/0097955 A1 | 4/2015 | De Wind et al. |
| 2015/0224930 A1 | 8/2015 | Foote et al. |
| 2017/0267179 A1 | 9/2017 | Herrmann et al. |
| 2017/0313249 A1 | 11/2017 | Brouwer et al. |
| 2018/0134218 A1 | 5/2018 | Lettis et al. |
| 2018/0265005 A1 | 9/2018 | Lettis et al. |
| 2019/0039522 A1 | 2/2019 | Foote et al. |
| 2019/0243492 A1 | 8/2019 | Uken et al. |
| 2020/0223364 A1 | 7/2020 | Peterson et al. |
| 2020/0353867 A1 | 11/2020 | Huizen et al. |
| 2021/0316664 A1 | 10/2021 | Baur |
| 2021/0331625 A1 | 10/2021 | Huizen et al. |
| 2022/0032847 A1 | 2/2022 | Huizen et al. |

FOREIGN PATENT DOCUMENTS

| | | |
|---|---|---|
| DE | 1530861 A1 | 6/1969 |
| DE | 1815368 B | 4/1970 |
| DE | 1755577 B1 | 5/1972 |
| DE | 4141657 A1 | 7/1992 |
| DE | 19538770 A1 | 4/1997 |
| DE | 19601429 C1 | 4/1997 |
| DE | 102008026039 A1 | 12/2009 |
| DE | 202010005203 U1 | 9/2010 |
| DE | 102009031809 A1 | 1/2011 |
| EP | 0064421 A1 | 11/1982 |
| EP | 0314839 A1 | 5/1989 |
| EP | 0780266 A2 | 6/1997 |
| EP | 1000807 A2 | 5/2000 |
| EP | 1188616 A2 | 3/2002 |
| EP | 1300289 A2 | 4/2003 |
| EP | 1755923 A1 | 2/2007 |
| EP | 2017127 A1 | 1/2009 |
| EP | 2112022 A1 | 10/2009 |
| EP | 2165886 A1 | 3/2010 |
| EP | 2492144 A1 | 8/2012 |
| EP | 2492145 A1 | 8/2012 |
| EP | 3321132 A1 | 5/2018 |
| FR | 2503647 A1 | 10/1982 |
| FR | 2605567 A1 | 4/1988 |
| GB | 2197829 A | 6/1988 |
| GB | 2244965 A | 12/1991 |
| WO | 2010124064 A1 | 10/2010 |
| WO | 2011044312 A1 | 4/2011 |
| WO | 2013071070 A1 | 5/2013 |
| WO | 2013126719 A2 | 8/2013 |

OTHER PUBLICATIONS

Yi Zhang et al., Basic Kinematics of Constrained Rigid Bodies, in Introduction to Mechanisms, Carnegie Mellon University, https://www.cs.cmu.edu/~rapidproto/mechanisms/chpt4.html.

UN Regulation No. 46, Revision 3, "Uniform provisions concerning the approval of devices for indirect vision and of motor vehicles with regard to the installation of these devices." (Year: 2009).

* cited by examiner

EXTERIOR REARVIEW MIRROR ASSEMBLY

CROSS REFERENCE TO RELATED APPLICATIONS

The present application is a division of U.S. patent application Ser. No. 17/663,228, filed May 13, 2022, now U.S. Pat. No. 11,623,568, which is a continuation of U.S. patent application Ser. No. 17/250,066, filed Nov. 18, 2020, now U.S. Pat. No. 11,351,919, which is a 371 national phase filing of PCT Application No. PCT/US2019/032340, filed May 15, 2019, which claims the filing benefits of U.S. provisional application Ser. No. 62/675,912, filed May 24, 2018, which is hereby incorporated herein by reference in its entirety.

FIELD OF THE INVENTION

The present invention relates generally to the field of rearview mirror assemblies for vehicles and, more particularly, to an exterior rearview mirror assembly that is operable to adjust a rearward field of view of the driver of the vehicle.

BACKGROUND OF THE INVENTION

Typically, an exterior rearview mirror assembly includes a mirror actuator that is operable to adjust a mirror reflective element relative to the mirror casing so as to adjust a rearward field of view of the driver of the vehicle. The reflective element and actuator are disposed in the mirror casing and the actuator adjusts the reflective element relative to the mirror casing. Powerfold exterior mirror assemblies include an actuator disposed at a mounting structure that pivots or folds the mirror casing relative to the side of the vehicle.

SUMMARY OF THE INVENTION

The present invention provides an exterior rearview mirror assembly configured for mounting at an exterior portion of a vehicle. The exterior rearview mirror assembly includes an actuator that is operable to pivot and adjust the mirror head relative to a mounting arm or base at the side of the vehicle so as to provide a mirror reflective element adjustment to adjust the rearward field of view of the driver of the vehicle and to provide a powerfold adjustment to move the mirror head relative to the side of the vehicle.

According to an aspect of the present invention, an exterior rearview mirror assembly is configured for mounting at an exterior portion of a vehicle and comprises a mounting arm configured for attachment at an exterior portion of the vehicle, and a mirror head comprising a mirror casing, a mirror reflective element and an actuator. The mounting arm is received through an aperture in the mirror casing and the actuator is attached at the mounting arm inside the mirror casing. The actuator is electrically operable to adjust the mirror reflective element and said the casing relative to the mounting arm, and the aperture allows for movement of the mirror casing relative to the mounting arm during operation of the actuator. The actuator comprises a first attachment element or vertical adapter plate that attaches at the mounting arm and a second attachment element or horizontal adapter plate that attaches to a housing bracket that is attached at the mirror casing. The actuator comprises a housing that houses first and second motors that drive respective first and second gears. The first gear engages a toothed arcuate flange or disc of the second attachment element, whereby, when the first motor is electrically operated, the first gear causes pivoting of the mirror head about a vertical pivot axis. The second gear engages a toothed arcuate flange of the first attachment element, whereby, when the second motor is electrically operated, the second gear causes pivoting of the mirror head about a horizontal pivot axis.

These and other objects, advantages, purposes and features of the present invention will become apparent upon review of the following specification in conjunction with the drawings.

DESCRIPTION OF THE PREFERRED EMBODIMENTS

An exterior rearview mirror assembly of the present invention may comprise dual actuators and dual pivot axes for adjusting a mirror head and reflective element relative to a side of a vehicle (such as at a vehicle door) at which the mirror assembly is mounted. The mirror assembly may utilize aspects of the mirror assemblies described in U.S.

Publication Nos. US-2015-0224930 and/or US-2015-0097955, and/or U.S. Pat. Nos. 9,487,142 and/or 9,346,403, and/or International Publication Nos. WO 2019/040711 and/or WO 2019/035078, which are hereby incorporated herein by reference in their entireties.

Figure 15:
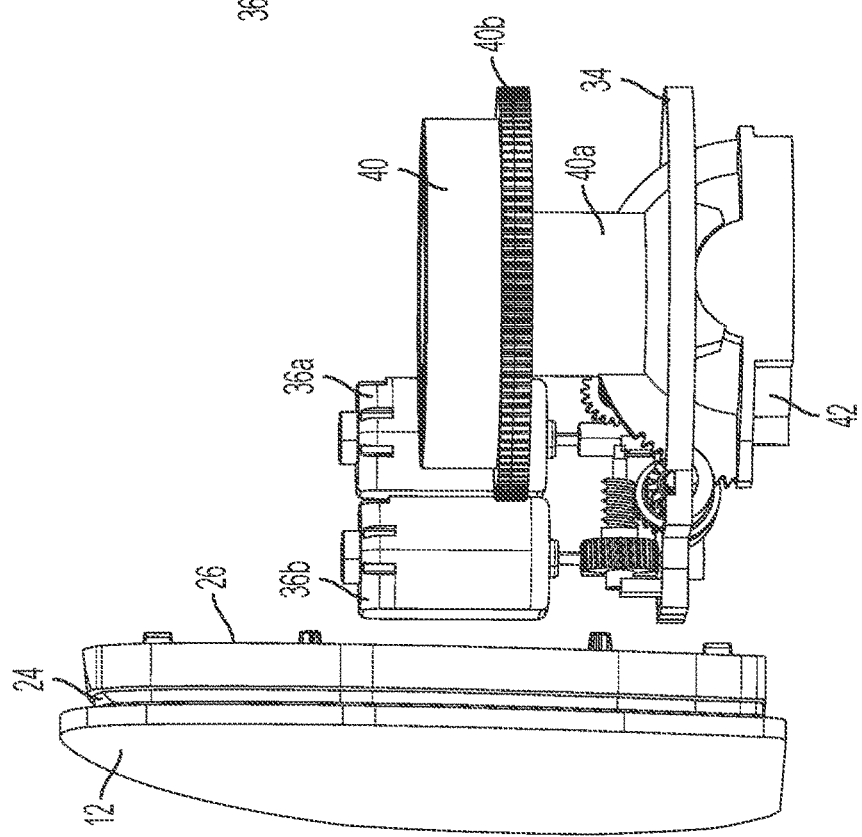
Figure 18:
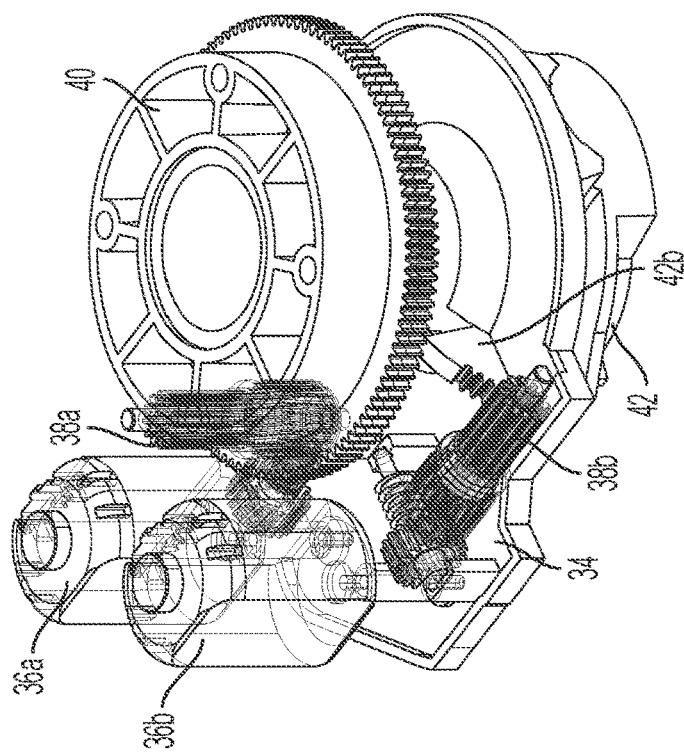
FIGS. 17 and 18 are perspective views similar to FIGS. 15 and 16, respectively, shown in wire frame format.
Figure 17:
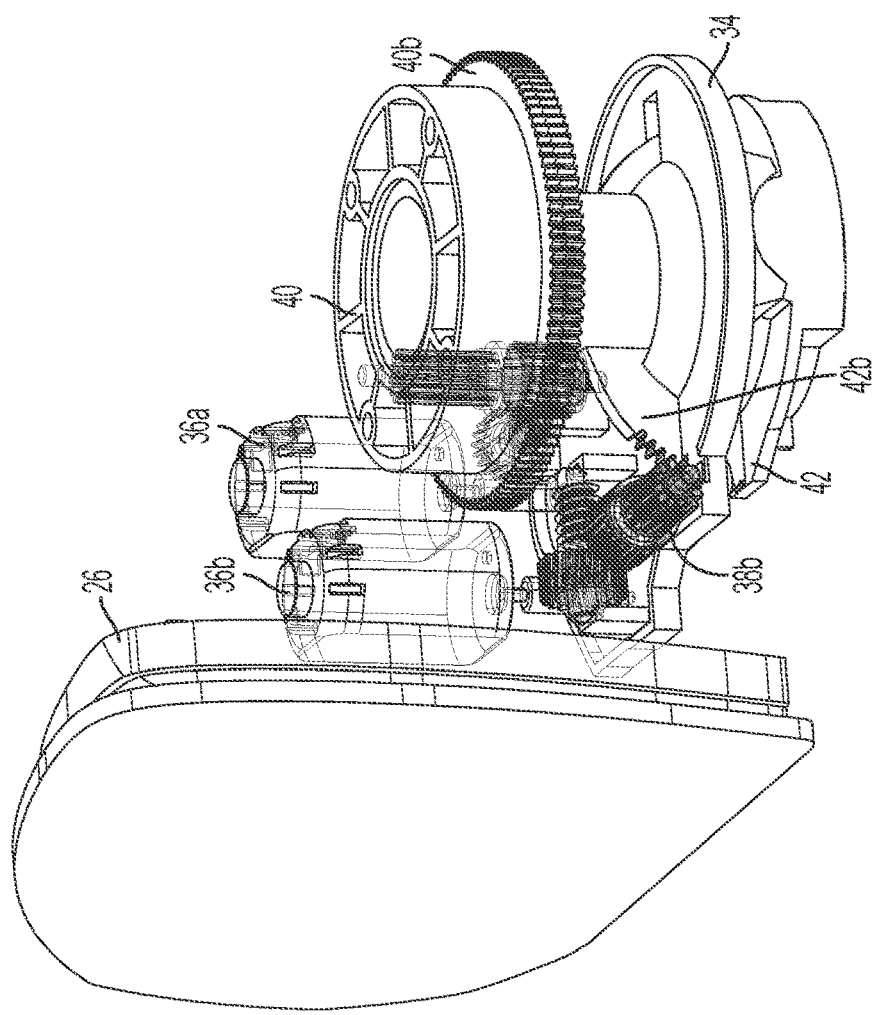

Referring now to the drawings and the illustrative embodiments depicted therein, an exterior rearview mirror assembly 10 includes a mirror reflective element 12 attached at an actuator 22 that is operable to adjust the mirror reflective element relative to a mounting arm 16 and a base portion 18. The mirror reflective element 12 is attached to the mirror casing via a head mounting plate 26, which is disposed at the rear of and attached at a back plate 24 (FIG. 15) disposed at the rear of the mirror reflective element. The actuator 22 is includes a housing bracket 46 that is attached at the mirror casing, and the actuator includes a first attachment element or vertical adapter plate 42 that is attached at a mounting arm bracket at the outer/upper end of the mounting arm 16. The mirror head 20 includes the mirror reflective element 12, which is attached to the back plate or glass case 24, which is attached at the head mounting plate 26, which has the mirror casing 14 (including an upper casing 14*a* and a lower casing 14*b*) attached thereto.

The mirror head 20 (including the mirror casing and mirror reflective element) is adjustable (with the mirror casing and mirror reflective element being adjustable together and in tandem) relative to the mounting arm 16 and base portion 18 via the actuator 22 attached at a bracket portion of the mirror assembly (as discussed in detail below). The mounting arm (or a lower portion of the actuator) is received through a gap or opening of the lower mirror casing 14*b*, with the opening providing clearance or a gap between the casing wall and the mounting post to allow for adjustment of the mirror head (including the mirror casing and reflective element) relative to the mounting arm 16 and base portion 18. The mirror casing and reflective element are thus adjusted together and in tandem (i.e., the mirror reflective element does not adjust relative to the mirror casing).

A gasket or head seal is provided at the opening of the lower mirror casing to generally seal or close over the opening of the mirror casing to limit water or dirt intrusion into the mirror casing. The head seal may comprise any suitable material, such as, for example, an EPDM rubber material. In the illustrated embodiment, the head seal comprises a flexible bellows configuration or design that allows movement of the mirror head relative to the mounting base and protects the internal components of the mirror assembly from water and contamination.

The mirror reflective element 12 is attached at the back plate 24 disposed at the rear of the mirror reflective element, such as, for example, by the mirror reflective element being adhesively attached at the back plate. The back plate 24 is attached at the head mounting plate 26 disposed at the rear of the back plate, such as, for example, via snap attaching the back plate or otherwise attaching or fastening the back plate (with the reflective element adhered thereto) at the head mounting plate. In the illustrated embodiment, the head mounting plate 26 is attached at or part of the lower casing 14*b* of the mirror casing 14, and the housing bracket 46 of the actuator 22 is attached at the lower casing 14*b*, such that movement of the actuator housing bracket 46 (via operation of the motors of the actuator) causes movement of the mirror casing 14, the head mounting plate 26, the mirror back plate 24 and the mirror reflective element 12 (all together and in tandem) relative to the mounting arm (as discussed below).

The actuator 22 is mounted at the bracket portion at the upper end of mounting arm or post or structure and is operable to adjust the mirror back plate and reflective element and mirror casing (together and in tandem) relative to the mounting arm to adjust the rearward field of view of the driver viewing the reflective element when the mirror assembly is mounted at the side of the vehicle. The actuator also provides a power fold function that operates to pivot the mirror head about a generally vertical or canted axis between a use position (where the mirror head is extended from the side of the vehicle and the reflective element is viewable by the driver of the vehicle and provides the driver with the desired or selected rearward field of view) and a folded or non-use or park position (where the mirror head is folded toward the side of the vehicle so that the reflective element is generally along the side of the vehicle and does not provide the driver with the selected rearward field of view). The mirror head 20 may pivot about a generally vertical or canted pivot axis to provide a breakaway mirror configuration.

In the illustrated embodiment, the mirror casing is fixed relative to the glass or reflective element and is adjustable (together and in tandem with the mirror reflective element and the mirror back plate) via the actuator relative to the bracket or mounting arm or mounting base. In a typical outside mirror, the reflective element is adjustable independently of the mirror head, which is fixed to the bracket. In the illustrated embodiment, the mirror casing moves with the reflective element (so that the mirror head is adjusted to adjust the rearward field of view at the reflective element). For sake of clarity, the assembly of the mirror casing, head mounting plate, glass-case or back plate, tape (that adheres the mirror reflective element at the back plate) and reflective element is referred to as the mirror head or mirror head assembly. The bracket design is used as a mount for the actuator and is coupled with the base (via the mounting arm) to provide a folding pivot.

The two motor actuator 22 utilizes one motor for horizontal mirror head (including mirror casing and mirror reflective element) rotation and one motor for vertical mirror head rotation. The mirror head is attached to the actuator horizontal adapter plate via the housing bracket 46. The actuator is attached to the mounting arm and mirror base via the vertical adapter plate 42. The actuator 22 comprises an upper housing 32 and a lower housing 34, which join to house the two motors 36*a*, 36*b* and respective associated gears 38*a*, 38*b*, which engage a second attachment element or toothed horizontal adapter plate 40 and the toothed vertical adapter plate 42, respectively. In the illustrated embodiment, the motors 36*a*, 36*b* are generally vertically oriented so that their output shafts are generally vertical and parallel to one another, with the respective gears 38*a*, 38*b* functioning to provide the desired rotational output for rotatably engaging a toothed arcuate flange of the horizontal adapter plate 40 and a toothed arcuate flange of the vertical adapter plate 42. A spring cup 44 is disposed at the vertical adapter plate 42 and the housing bracket 46 is disposed at and attached to the horizontal adapter plate 40 and at the lower mirror casing 14*b* to attach or connect the actuator to the mirror casing and the mirror reflective element.

The actuator housing 32, 34 is disposed at and around the vertical adapter plate 42, with the toothed arcuate flange of the vertical adapter plate 42 received through a slot at the lower housing 34 so that the housing and the vertical adapter plate do not rotate relative to one another. The vertical adapter plate 42 fixedly attaches (such as via one or more fasteners or such as via a snap attachment) at a bracket at the upper and outer end of the mounting arm (see FIGS. 33-35). The lower housing 34 is disposed at the fixed vertical adapter plate 42 and is pivotable (about a horizontal pivot axis) relative to the vertical adapter plate so that the lower housing (and the entire mirror head) can pivot about a generally horizontal pivot axis relative to the mounting arm. The horizontal pivot axis is horizontal with the exterior rearview mirror assembly mounted at the side of the equipped vehicle and extends generally laterally across the vehicle, such as in a direction generally normal to a longitudinal axis of the vehicle, and/or may extend generally parallel to the generally planar surface of the mirror reflective element.

Figure 1:
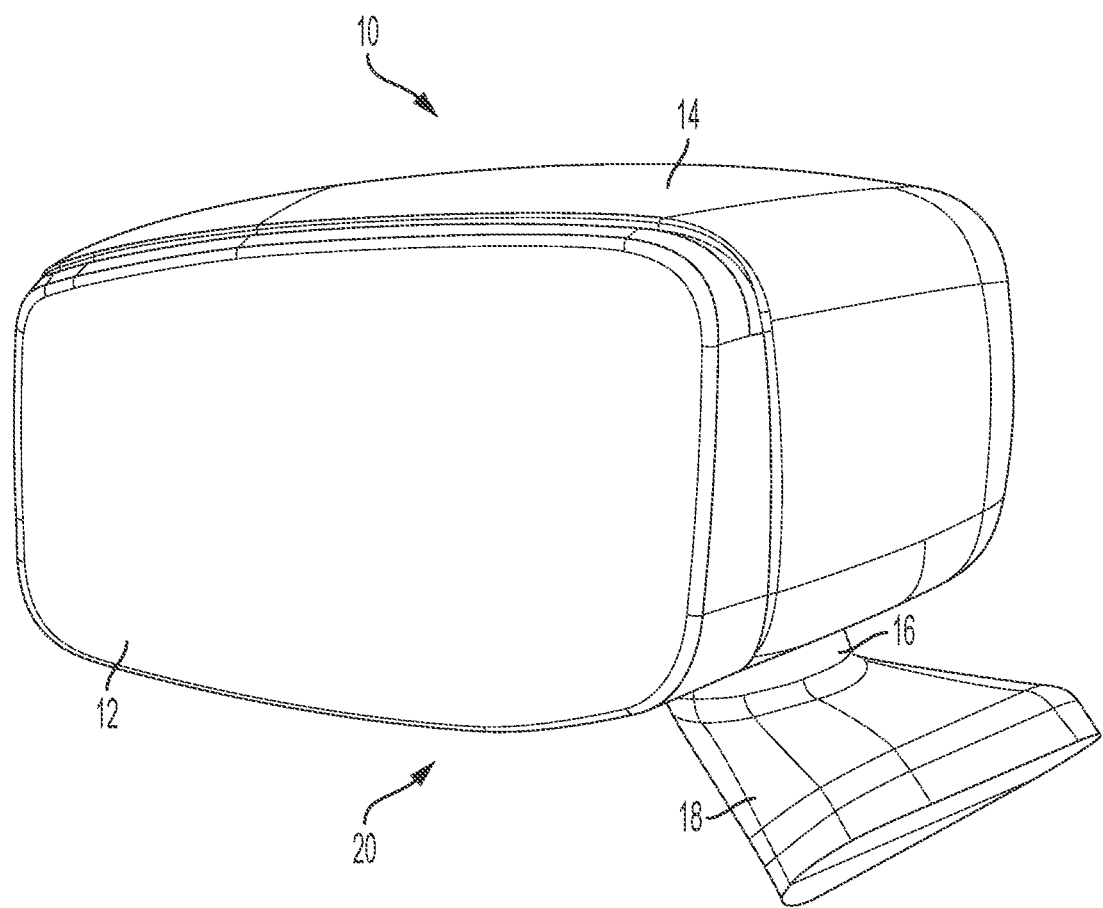
FIG. 1 is a perspective view of an exterior rearview mirror assembly in accordance with the present invention.
Figure 3:
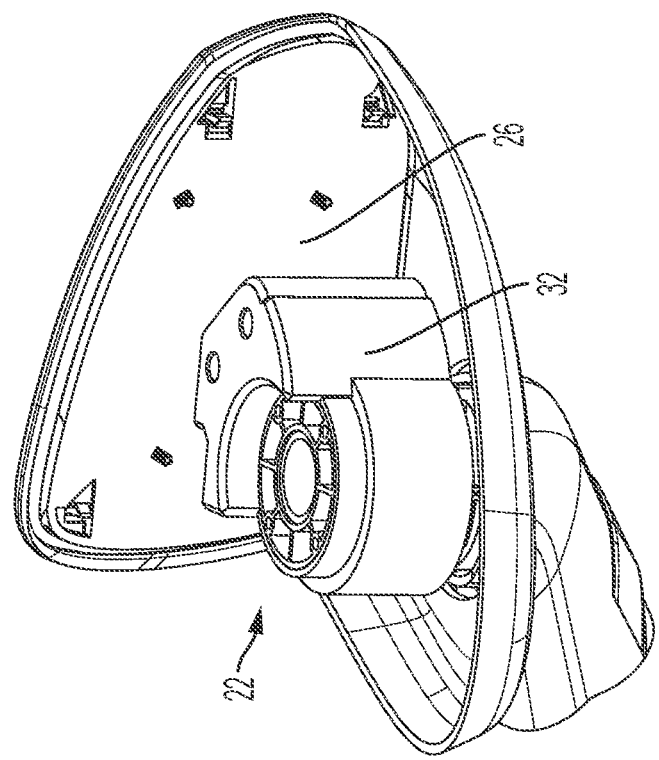
FIG. 3 is a perspective view similar to FIG. 2, with the upper mirror casing removed.
Figure 2:
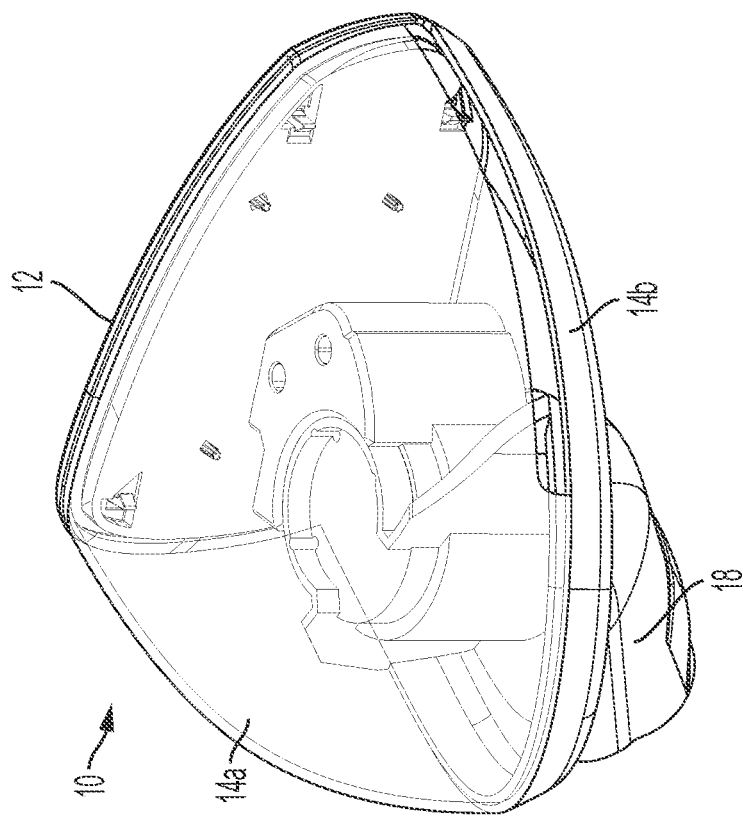
FIG. 2 is a perspective view from the front of the mirror assembly.
Figure 5:
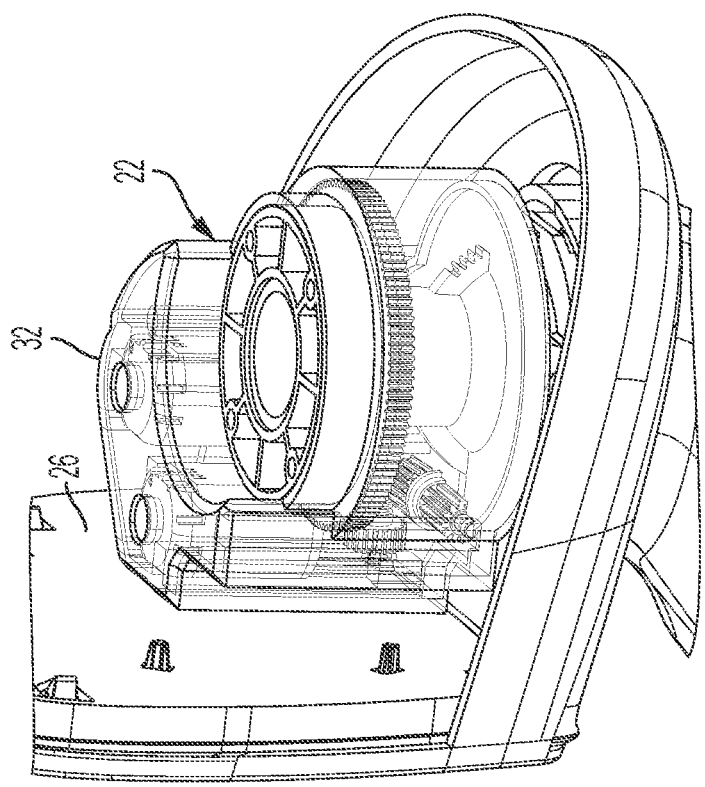
FIGS. 4 and 5 are perspective views similar to FIG. 3, showing different view angles.
Figure 4:
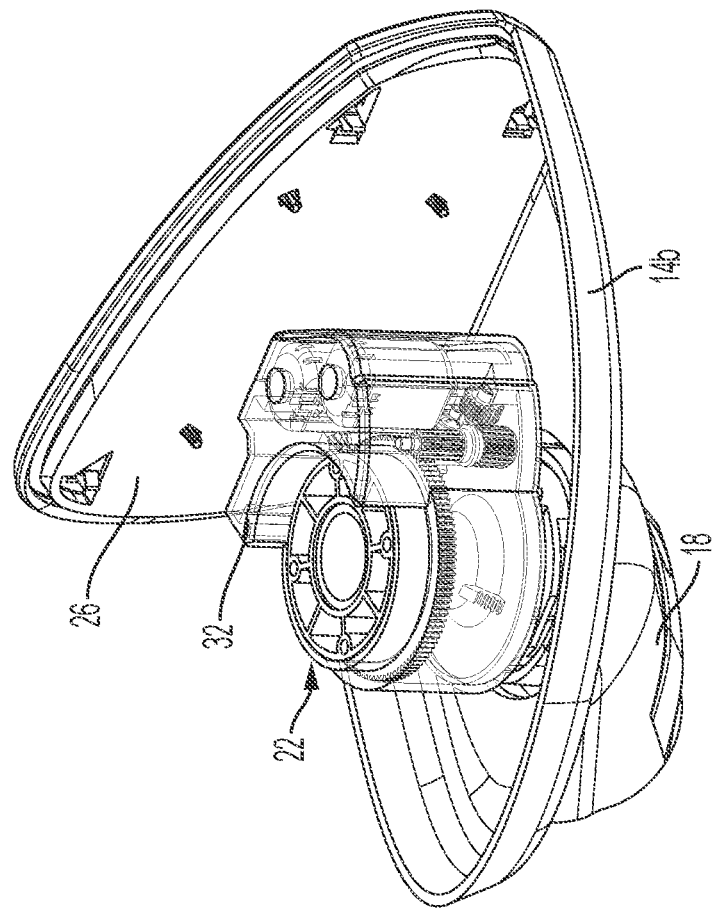
Figure 7:
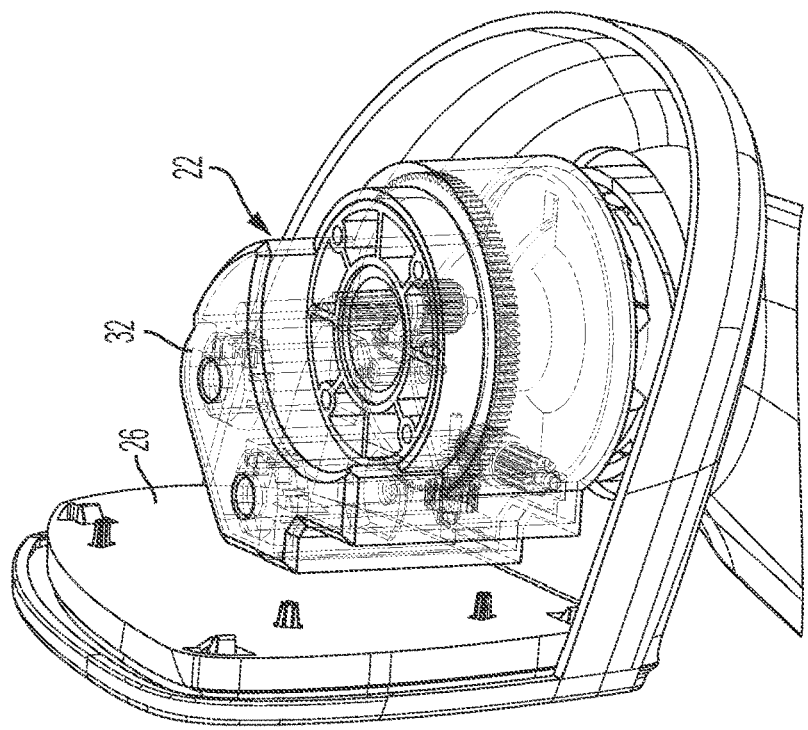
FIGS. 6 and 7 are perspective views similar to FIGS. 4 and 5, respectively, shown in wire frame format.
Figure 6:
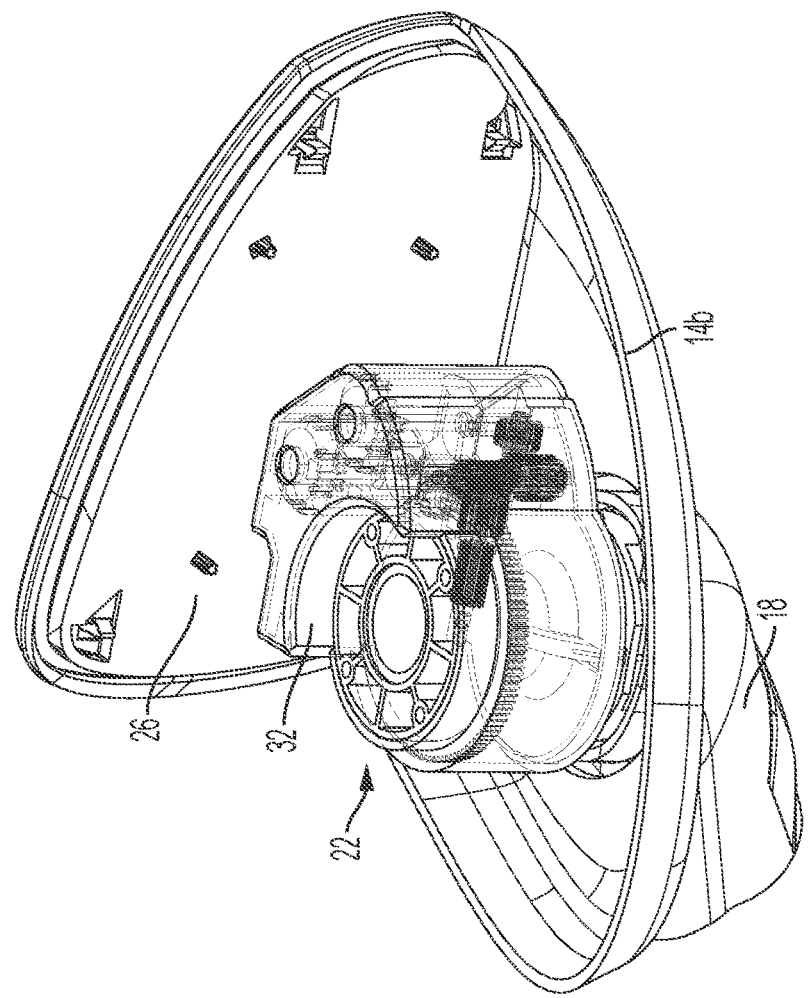
Figure 9:
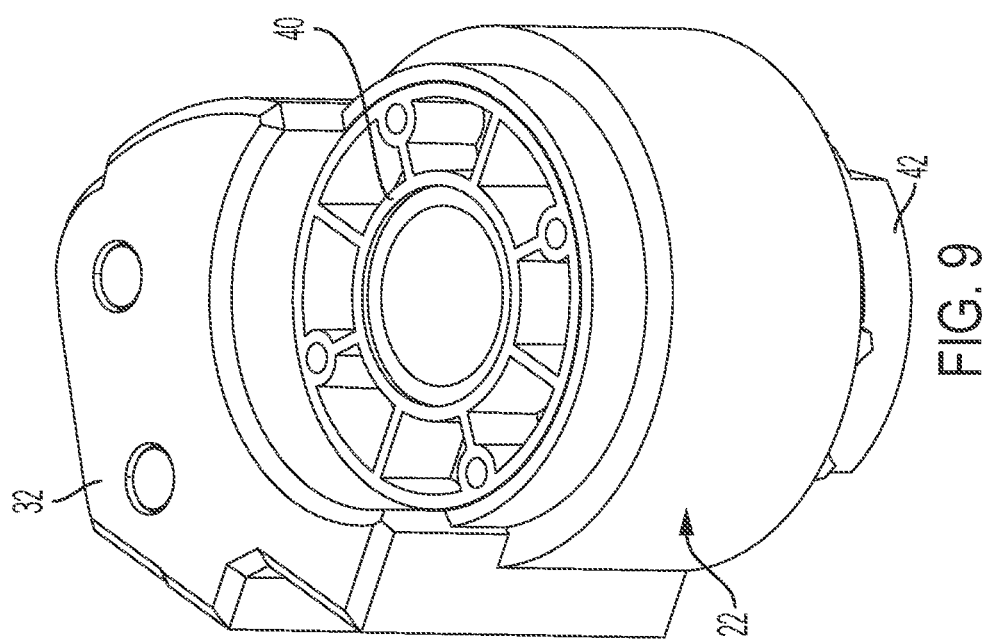
FIGS. 8 and 9 are perspective views of the actuator of the mirror assembly.
Figure 8:
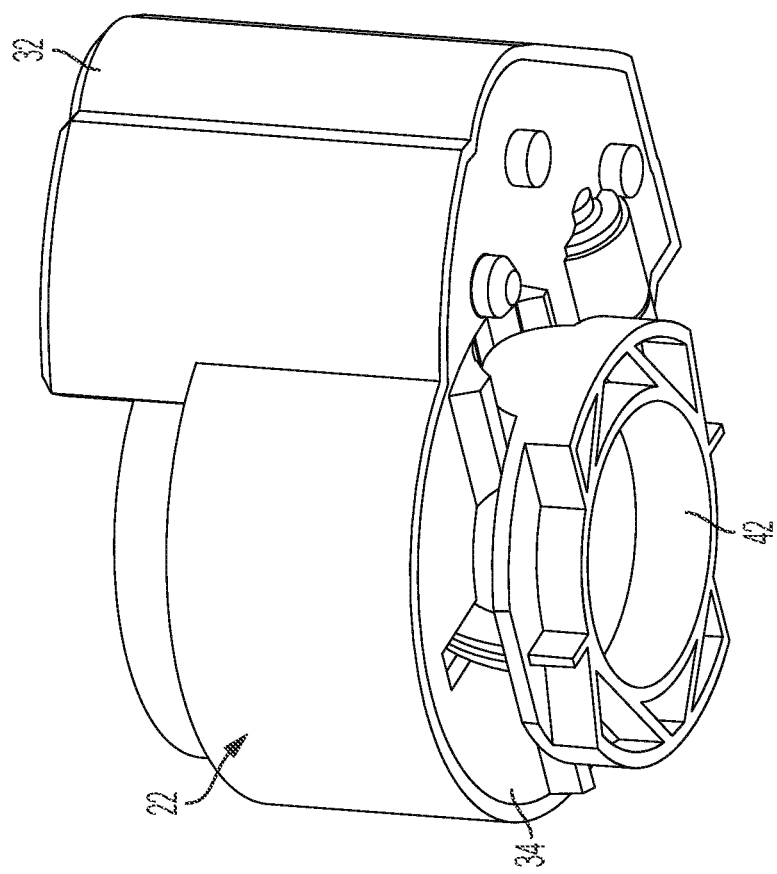
Figure 10:
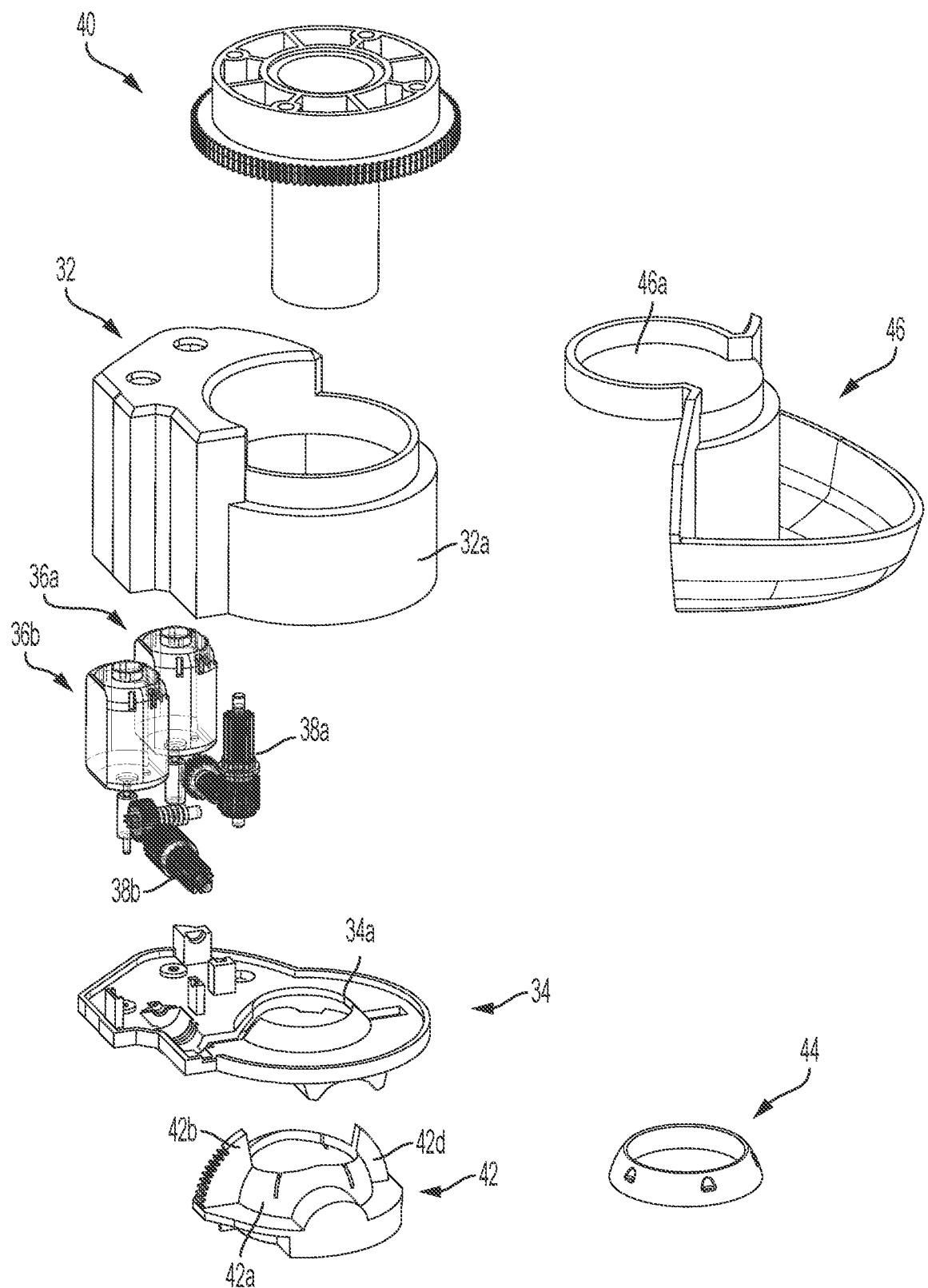
FIG. 10 is an exploded perspective view of the actuator.
Figure 12:
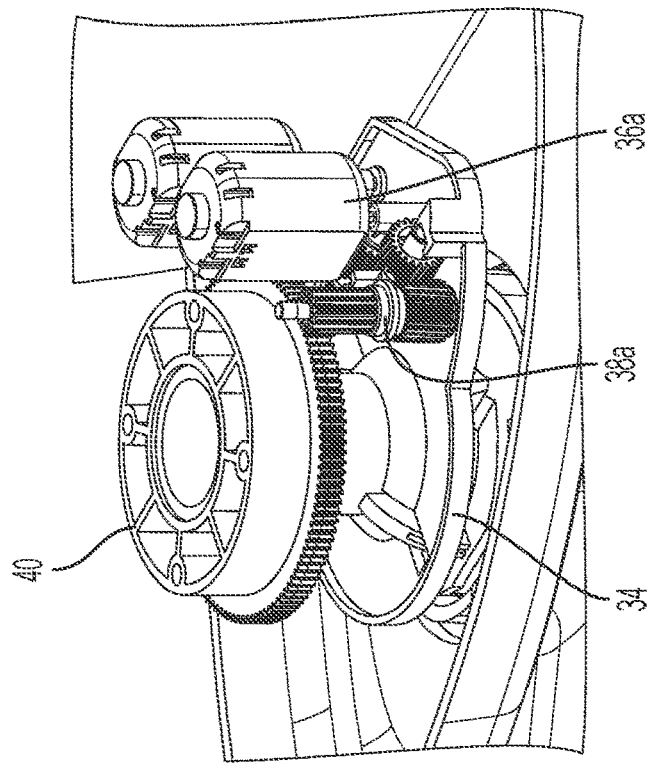
FIGS. 11 and 12 are perspective views similar to FIGS. 4 and 5, shown with the actuator upper housing removed.
Figure 11:
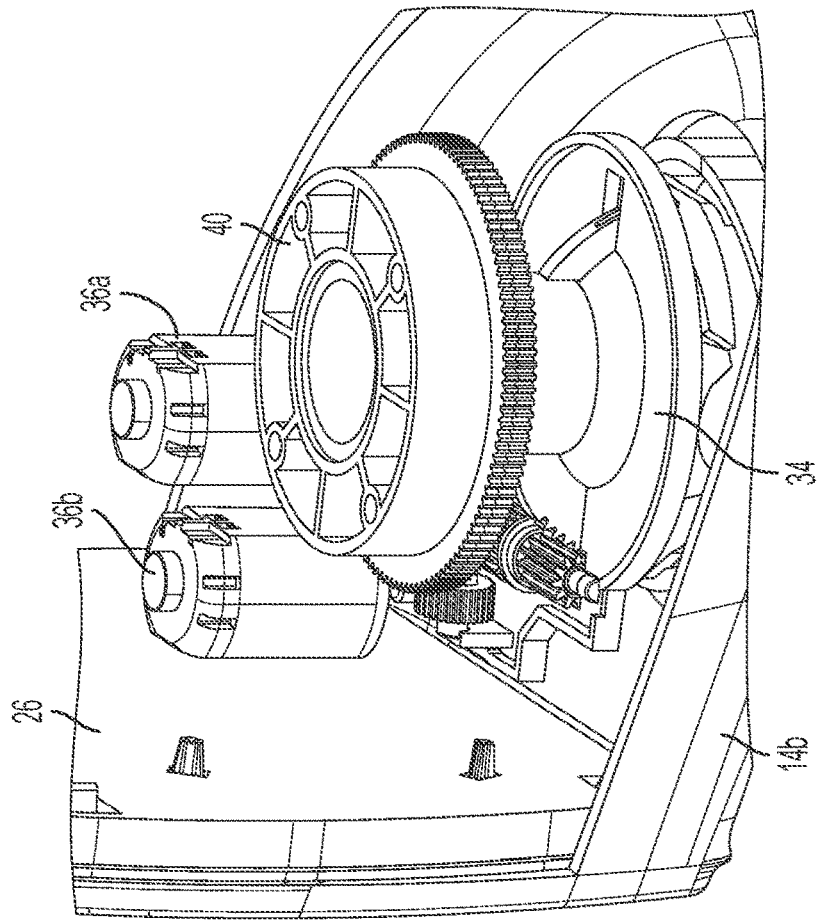
Figure 14:
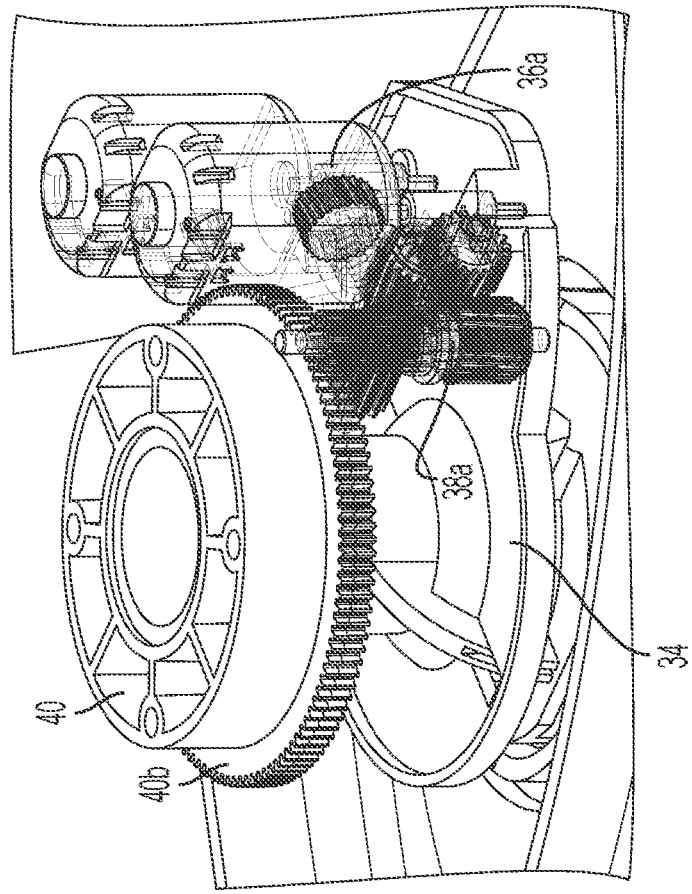
FIGS. 13 and 14 are perspective views similar to FIGS. 11 and 12, respectively, shown in wire frame format.
Figure 13:
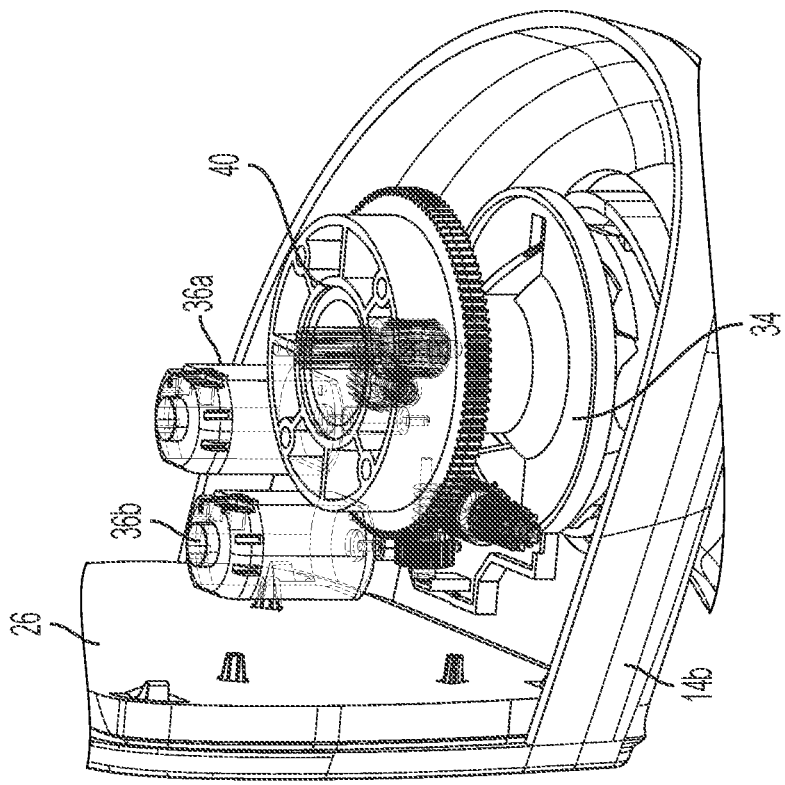
Figure 16:
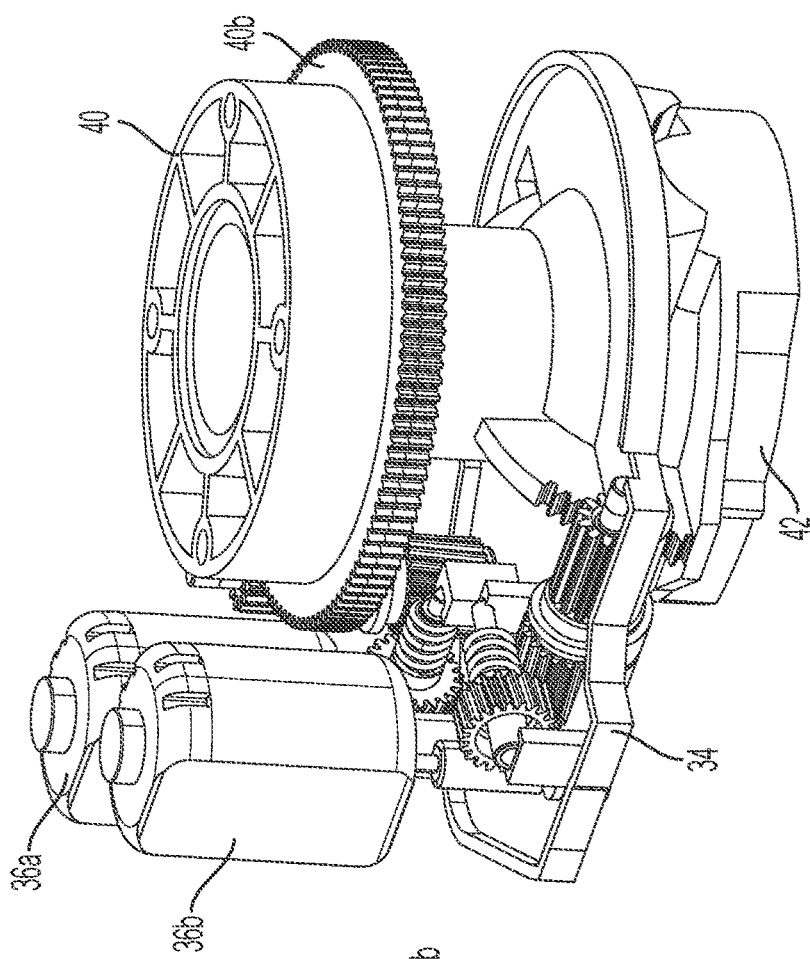
FIGS. 15 and 16 are other perspective views showing the actuator without the upper housing.

The horizontal adapter plate 40 is received through a passageway of the upper housing 32. The housing bracket 46 includes an attachment portion 46a that is attached (such as via a plurality of fasteners) to an upper end of the horizontal adapter plate, such that the housing bracket 46 rotates with rotation of the horizontal adapter plate about the vertical axis and about an outer cylindrical surface 32a (FIG. 10) of a receiving portion of the upper housing 32. The housing bracket 46 is also attached at or fixed relative to (such as via fasteners or snap attachment or adhesive) the lower mirror casing, such that adjustment or movement of the housing bracket (discussed below) moves the mirror casing and reflective element (together and in tandem) relative to the mounting arm.

The horizontal adapter plate 40 includes a shaft or post portion 40a and a circular disc-shaped portion 40b (at which the housing bracket is attached and around which teeth are formed for engagement with the output gear 38a). The post portion 40a is received at and/or extends through an aperture of the spherical shape portion of the vertical adapter plate and is retained therein via the spring cup 44 (see FIGS. 33-35), which may be press fit onto the post portion 40a to limit retraction of the post portion from the aperture of the vertical adapter plate. The horizontal adapter plate pivots with the housing 32, 34 about the horizontal axis when the motor 36b is actuated. The upper end of the horizontal adapter plate 40 comprises a circular disc shaped portion having a plurality of teeth disposed or established circumferentially at least partially around the disc shaped portion for engaging the output gear 38a associated with the motor 36a.

The housing 32, 34 and horizontal adapter plate 40 are disposed at the vertical adapter plate 42 in a manner that allows for pivoting or rotating of the housing and horizontal adapter plate 40 relative to the vertical adapter plate 42 about a horizontal pivot axis, but does not allow for pivoting or rotating of the housing relative to the vertical adapter plate 42 about a vertical pivot axis. This is achieved via a spherical receiving portion 34a of the lower housing 34 that receives a spherical shape 42a of the vertical adapter plate 42 therein. The vertical adapter plate 42 includes two flanges 42b, 42d that are received in slots of the lower housing 34 to limit rotation of the lower housing 34 about a vertical axis relative to the lower adapter plate. One of the flanges comprises a toothed arcuate flange that includes a plurality of teeth disposed along the arcuate surface of the toothed arcuate flange.

Figure 35:
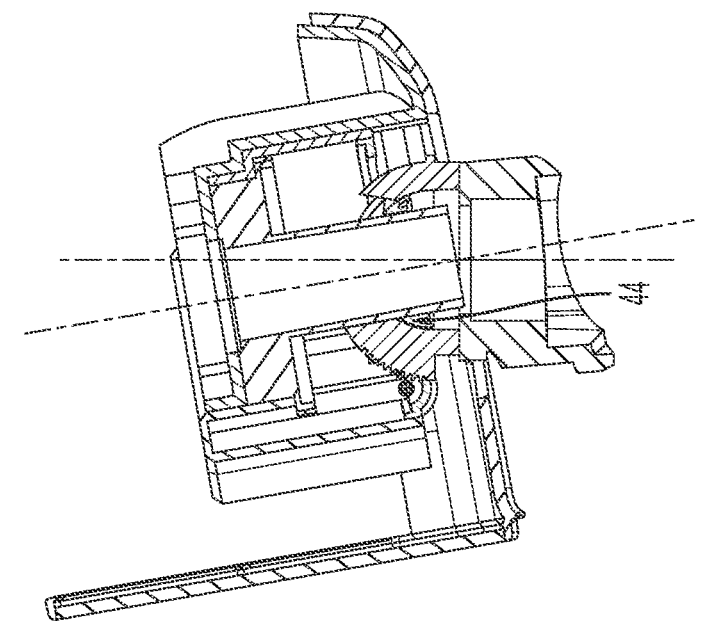
FIGS. 33-35 are sectional views similar to FIGS. 28-30, respectively, showing the function of the vertical travel stops of the actuator.
Figure 34:
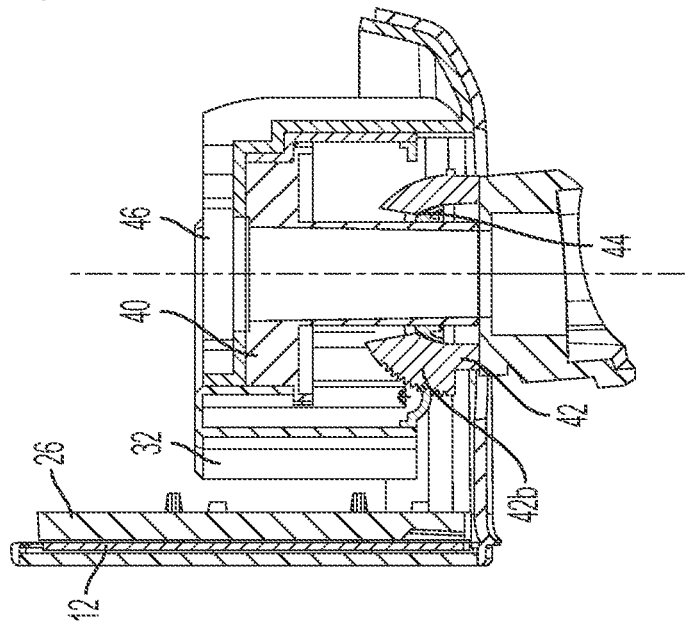
Figure 33:
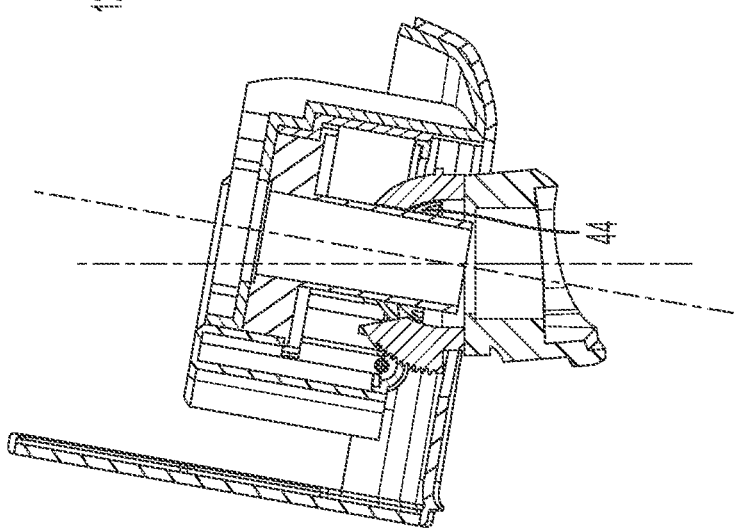

Thus, the vertical adapter plate 42 is fixedly attached at the mounting arm and the actuator housing 32, 34 and horizontal adapter plate 40 and the actuator housing bracket 46 (and thus the mirror casing and mirror reflective element) are adjustably mounted at the vertical adapter plate so that these components can pivot about a horizontal pivot axis relative to the vertical adapter plate 42 (see, for example, FIGS. 33-35). The horizontal adapter plate 40 is rotatable or pivotable about a generally vertical axis relative to the housing 32, 34 and at the vertical adapter plate 42, such that the horizontal adapter plate 40 (and the actuator housing bracket 46 (and thus the mirror casing and mirror reflective element) are adjustably mounted at the vertical adapter plate so that these components can pivot or rotate about a vertical pivot axis relative to the vertical adapter plate 42 (see, for example, FIGS. 19-24). The vertical pivot axis is vertical with the exterior rearview mirror assembly mounted at the side of the equipped vehicle and with the mirror head in its nominal orientation (and this pivot axis tilts or cants to one side or the other as the mirror head is adjusted about the horizontal pivot axis). The horizontal attachment element 40 thus is received at the aperture of the vertical attachment element 42 and is pivotable relative to the vertical attachment element 42 about the horizontal pivot axis, where the horizontal attachment element 40 pivots with the actuator bracket and the actuator housing and the mirror casing and the mirror reflective element.) The horizontal attachment element 40 is also pivotable relative to the vertical attachment element 42 about the vertical pivot axis, where the horizontal attachment element 40 pivots with the actuator bracket and the mirror casing and the mirror reflective element, but the actuator housing does not pivot about the vertical pivot axis with the horizontal attachment element due to the keyed engagement of the flanges 42b, 42d of the vertical attachment element with the slots of the lower housing 34.

During operation of the actuator, one of the gears 38b (such as a generally horizontally oriented worm gear of the plurality of gears) of actuator motor 36b engages the teeth of the toothed arcuate flange of the vertical adapter plate 42 and, when motor 36b is actuated, imparts pivoting of the housing 32, 34 about a horizontal axis relative to the vertical adapter plate. During operation of the actuator, one of the gears 38a (such as a generally vertically oriented worm gear of the plurality of gears) of actuator motor 36a engages the teeth of the circular disc of the horizontal adapter plate 40 and, when motor 36a is actuated, imparts pivoting of the housing bracket 46 about a vertical axis defined by the axis of the post portion of the horizontal adapter plate.

Figure 21:
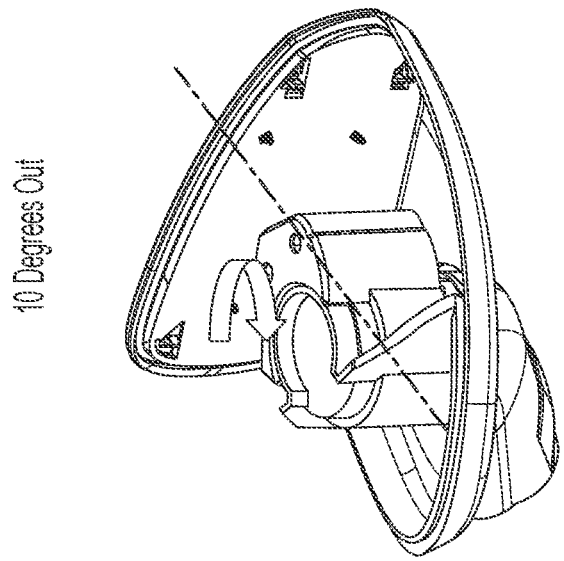
FIGS. 19-21 are perspective views similar to FIG. 3, showing different positions of the mirror head during horizontal rotation.
Figure 20:
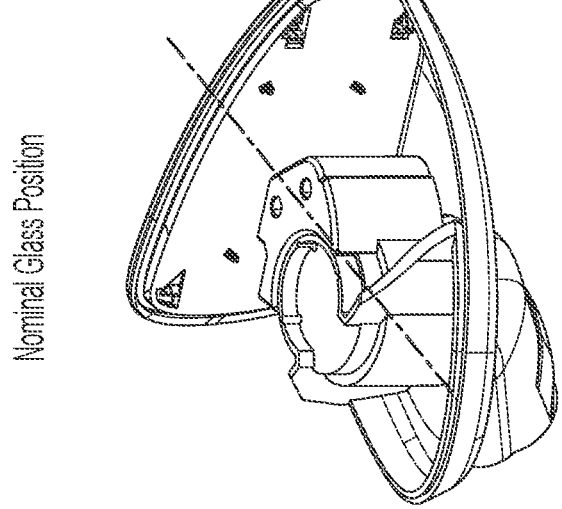
Figure 19:
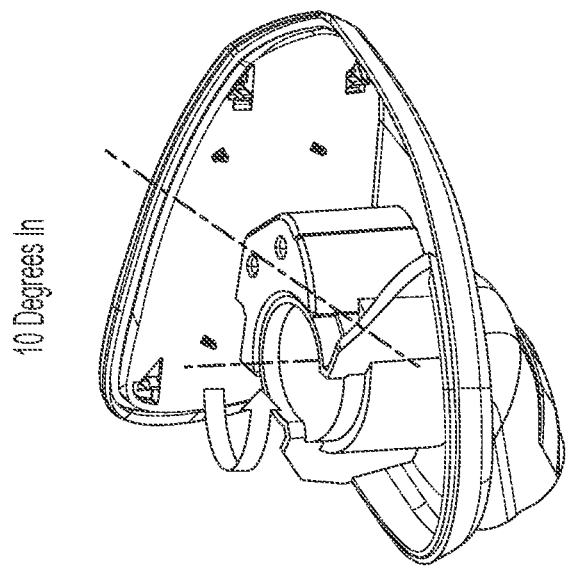
Figure 24:
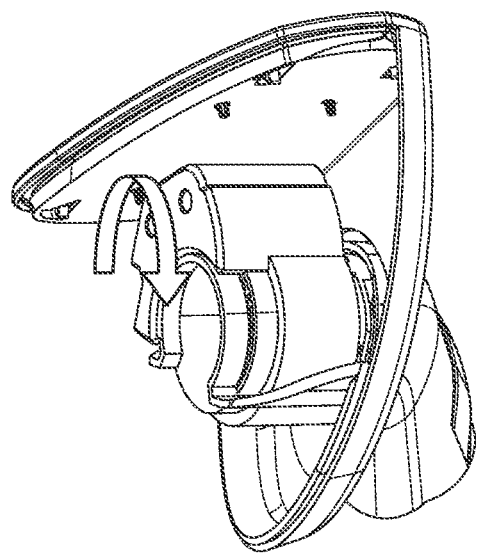
FIGS. 22-24 are perspective views similar to FIG. 3, showing different positions of the mirror head during powerfold operation.
Figure 23:
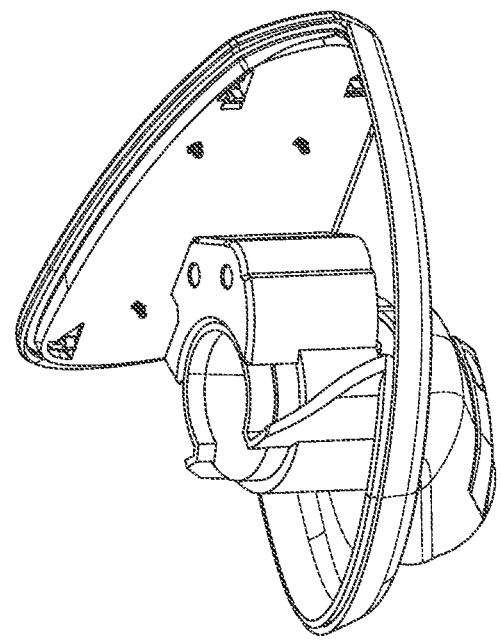
Figure 22:
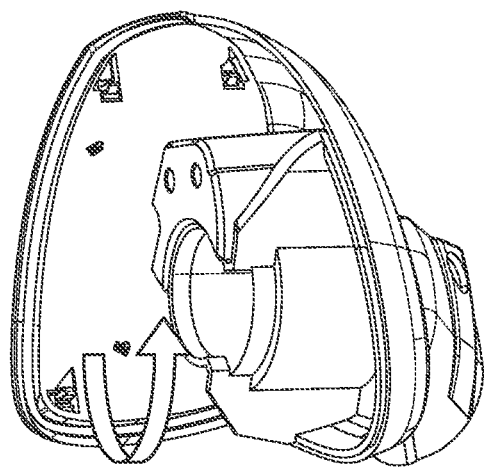

Thus, during horizontal mirror head rotation, the actuator body (motors 36a, 36b, gears, 38a, 38b, housing 32, 34) remains in place relative to the mounting arm as the horizontal adapter plate 40 and the housing bracket 46 (and thus the mirror head) pivot about the vertical axis (see FIGS. 19-21). As can be seen in FIGS. 19-21, the actuator housing 32, 34 does not move during such pivotal movement, while the lower mirror casing 14b and housing bracket 46 pivot about the vertical axis relative to the mounting arm and actuator body (with the curved or partial cylindrical portion 46b of the housing bracket sliding along the cylindrical receiving portion 32a of the upper housing). As shown in FIGS. 22-24, the same motor and pivot axis as used for adjusting the mirror position are also used to powerfold the mirror head. As can be seen in FIGS. 22-24, the upper housing 32 does not move, while the lower mirror casing 14b and housing bracket 46 pivot (via rotation of the horizontal adapter plate 40) about the vertical axis relative to the mounting arm and actuator body.

Figure 27:
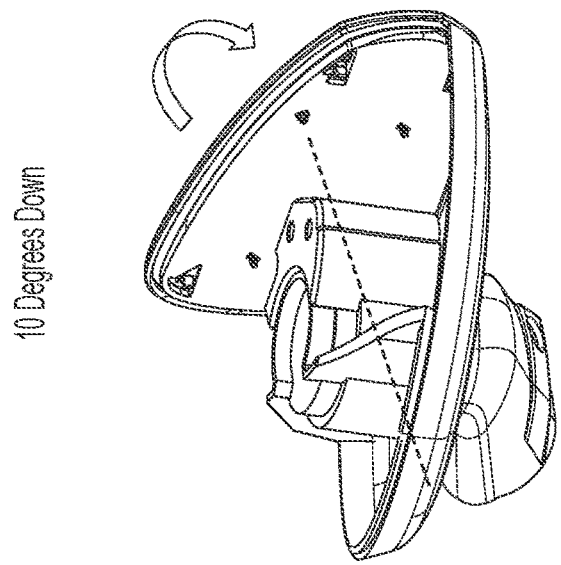
FIGS. 25-27 are perspective views similar to FIG. 3, showing different positions of the mirror head during vertical rotation.
Figure 26:
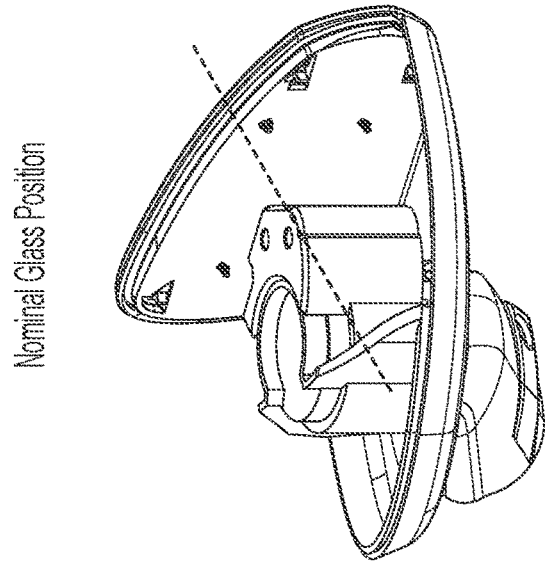
Figure 25:
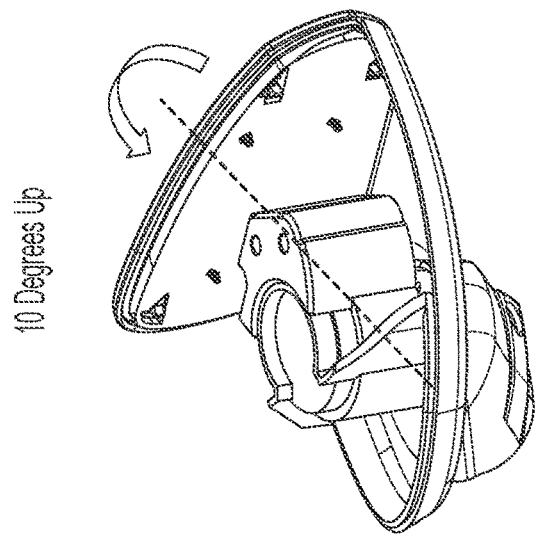
Figure 30:
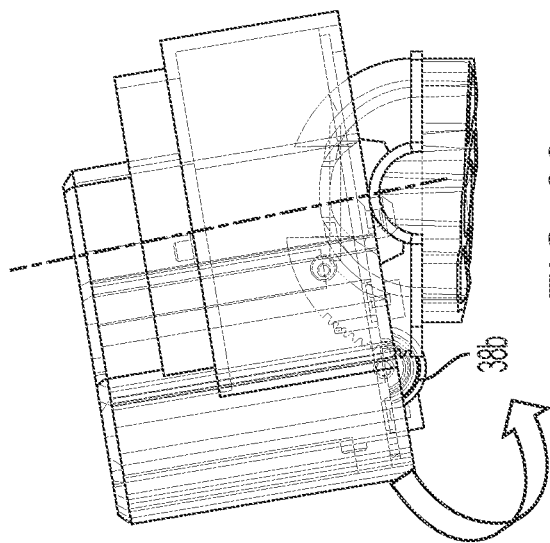
FIGS. 28-30 are side elevations of the actuator for the mirror head positions of FIGS. 25-27.
Figure 29:
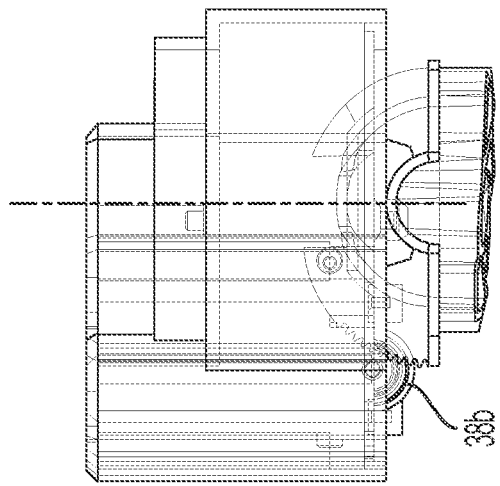
Figure 28:
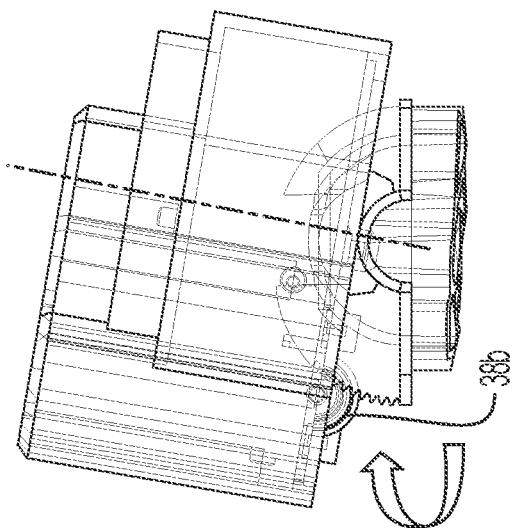
Figure 32:
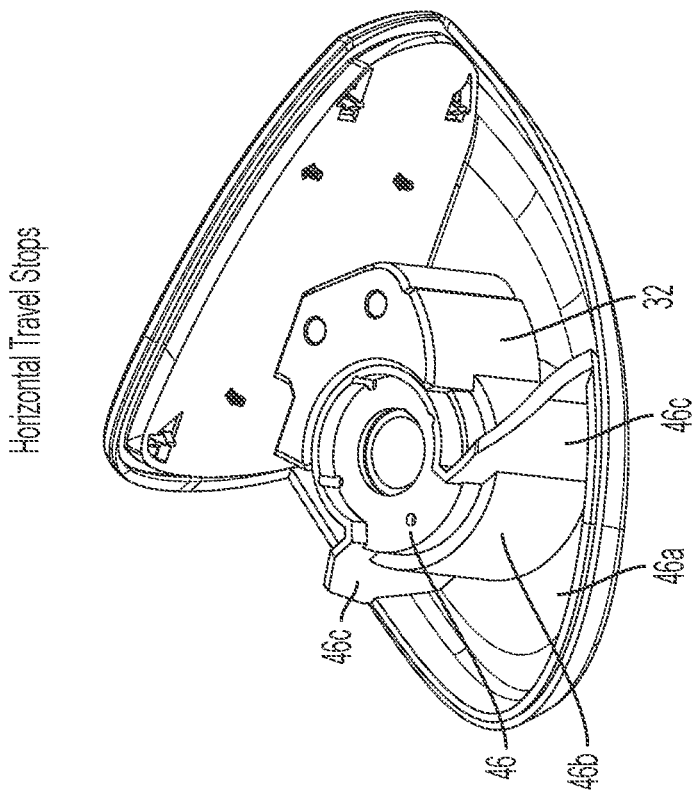
FIG. 32 is a perspective view of the mirror head and actuator, showing horizontal travel stops for the actuator.
Figure 31:
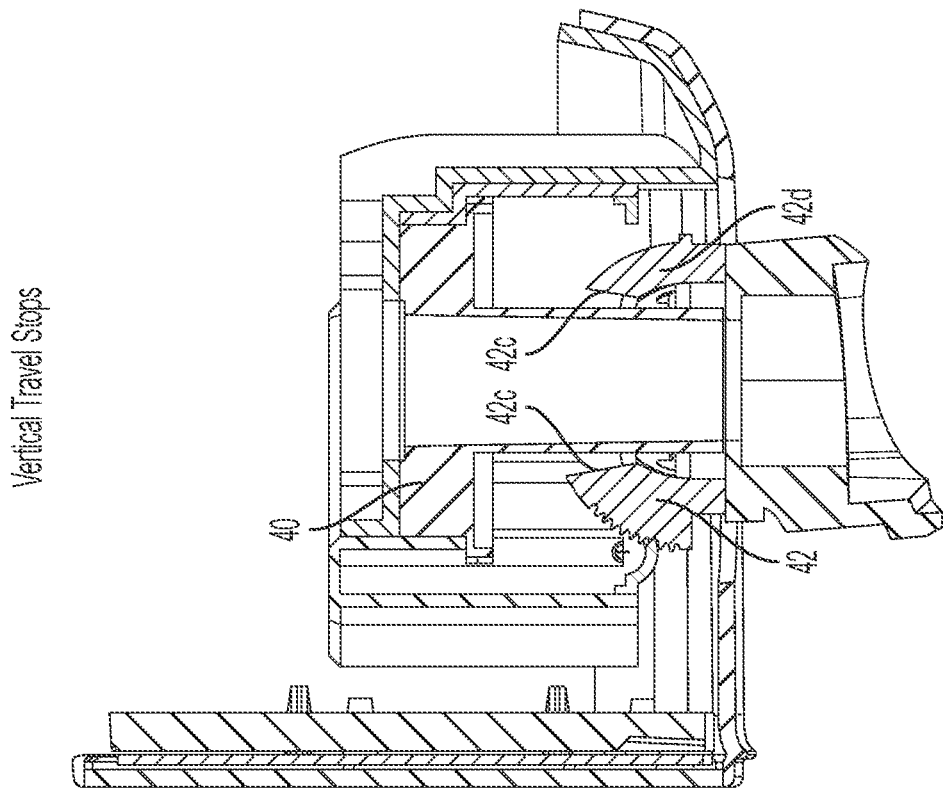
FIG. 31 is a sectional view of the mirror head and actuator, showing vertical travel stops of the actuator.

During vertical mirror head rotation, the vertical adapter plate 42 remains in place while the actuator body, horizontal adapter plate 40, and mirror head rotate about a horizontal axis (see FIGS. 25-27). As can be seen with reference to FIGS. 28-29, when the actuator motor 36b is actuated, the horizontally oriented gear of gears 38b rotate and move up (FIG. 28) or down (FIG. 30) as the gears travel along the arcuate toothed surface of the flange 42b to pivot the housing 32, 34 and mirror head about a horizontal axis.

Thus, operation of the motors individually provides the respective horizontal or vertical pivoting of the mirror head relative to the mounting arm. When the motors are both operated, the mirror head can be pivoted to any desired orientation within the limits of the horizontal pivoting and vertical pivoting.

In the illustrated embodiment, the mirror assembly includes travel stops that establish the limits or range of motion during vertical tilting and horizontal rotation. As shown in FIGS. 19-24 and 32, horizontal travel stops are provided by flanges 46c of the housing bracket 46, which, when the mirror head is fully pivoted inward or outward, engage a respective stop surface of the upper housing 32. To limit pivoting of the mirror head about the horizontal axis, the vertical adapter plate includes ends 42c of the toothed flange 42b and of the non-toothed flange 42d (FIG. 31), which engage the post portion 40a of the horizontal adapter plate 40. As shown in FIGS. 28-29, 31 and 33-35, the ends 42c engage the outer surface of the post portion 40a when the mirror head is pivoted in that respective direction, such as about 10 degrees upward from a nominal position (where the axis of rotation of the horizontal attachment element is generally vertical when the mirror assembly is mounted at the side of the vehicle) or about 10 degrees downward from the nominal position. The pivot axis of the horizontal attachment element is referred to herein as a vertical pivot axis but the vertical pivot axis may be vertical or tilted or canted 10 degrees or more (such as 15 degrees) from vertical as the mirror head is adjusted about its horizontal pivot axis.

Thus, the mirror assembly provides full adjustment of the mirror head relative to the mounting arm via a single actuator that also provides the powerfold function. The motors are independently operated to provide the desired adjustment and may be operated in tandem to adjust the mirror head both vertically and horizontally at the same time. The gears include clutches to allow for manual override so that the mirror head may be manually pivoted.

Figure 36:
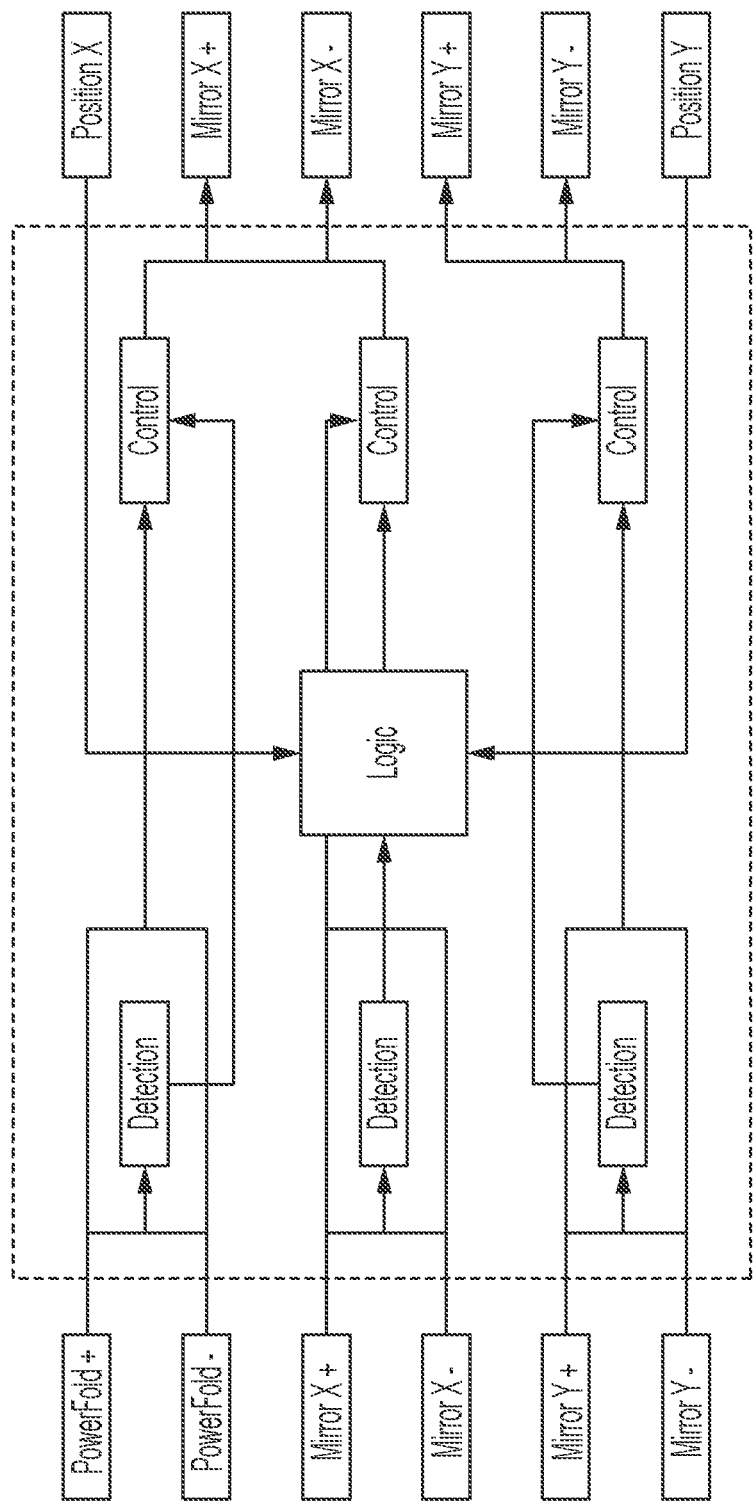
FIG. 36 is block diagram showing a control function for the mirror assembly of the present invention.

The mirror head is thus adjusted via the actuator, which is controlled via a control or controller (see FIG. 36). The control schematic of FIG. 36 receives three pair of inputs from the vehicle (vertical and horizontal glass actuation and powerfold) and provides two pair of outputs to a two motor actuator. To differentiate the horizontal glass motion from the powerfold motion, the controller sends a modulated signal that reduces the horizontal speed for glass motion, and allows for full speed for powerfold motion. The sensors can be implemented in order to compensate for differences in drive voltage and temperature.

The mirror assembly of the present invention allows for inclusion of other accessories (such as turn signal indicators, blind spot indicators, lights, displays and/or the like) in the mirror head, without concerns of interference with conventional actuators disposed in the mirror head and at and behind the mirror reflective element. The exterior rearview mirror assembly and/or actuators may utilize aspects of the exterior rearview mirror assemblies described in U.S. Pat. Nos. 9,067,541; 8,915,601; 8,764,256; 7,722,199; 7,314,285; 7,267,449; 7,159,992; 7,104,663; 7,093,946; 7,080,914; 7,073,914; 6,916,100; 6,755,544; 6,698,905; 6,685,864; 6,467,920; 6,362,548; 6,312,135; 6,243,218; 6,229,226; 6,213,612; 5,986,364; 5,900,999 and/or 5,703,731, and/or U.S. Publication No. US-2007-002477, and/or International Publication Nos. WO 2013/126719 and/or WO 2013/071070, which are all hereby incorporated herein by reference in their entireties.

Optionally, for example, the technology of the present invention allows for new technology or content to be readily added to and mounted into the mirror head. For example, the mirror head may include a camera disposed behind the reflective element, and/or the mirror head may include a display screen (such as a liquid crystal display screen or the like) disposed behind the reflective element and/or the mirror head may include any other electronic or mechanical content, such as, for example, a blind spot indicator and/or a turn signal indicator and/or an illumination module and/or wide angle reflector elements and/or the like.

Optionally, the reflective element may comprise a frameless reflective element, such as the types shown and/or described in U.S. Des. Pat. Nos. 7,253,723; 8,154,418; 8,508,831; 8,730,553; 9,598,016 and/or 9,346,403, and/or U.S. Publication Nos. US-2014-0313563 and/or US-2015-0097955, which are hereby incorporated herein by reference in their entireties. In such an application, the mirror reflective element may have a rounded or ground perimeter edge region at its periphery of the front surface, and such a rounded or ground or polished perimeter edge region of the glass substrate of the reflective element may be exposed to, contactable by and/or viewable by the driver of the vehicle and may comprise a polished perimeter that is polished to a water-clear finish and may have a radius of curvature of at least about 2.5 mm. The rounded perimeter edge of the glass substrate of the mirror reflective element may provide a generally smooth or continuous transition from the generally planar (or slightly curved) front surface of the mirror reflective element to the outer surface of the mirror head or mirror casing at which the mirror reflective element is mounted. Optionally, the mirror reflective element may have a thin or very thin bezel at the perimeter region of the front surface of the reflective element, and optionally, the mirror reflective element may have a clear bezel at the perimeter region of the front surface of the reflective element, or the like, depending on the particular application of the mirror assembly and the desired appearance and/or styling of the mirror assembly.

Optionally, other mirror designs or configurations may be contemplated in accordance with the present invention, such as various configurations of the mirror casing and reflective element and any bezel at the mirror reflective element. Optionally, the mirror casing (or separate bezel portion of the mirror casing) may circumscribe the periphery of the mirror reflective element to provide a generally smooth or continuous transition from the generally planar (or slightly curved) front surface of the mirror reflective element to the outer surface of the mirror head or mirror casing at which the mirror reflective element is mounted. For example, the mirror casing may comprise a plastic molding (such as formed via injection molding of a polymeric material) that comprises a portion that (a) abuts a circumferential edge of the mirror glass substrate (such as the front glass substrate of an electrochromic mirror reflective element or a glass prism of a prismatic mirror reflective element) and (b) has an outer curved surface that extends from generally adjacent to a first surface of the glass substrate and that may lack a sharp edge, and that does not encroach onto the outer glass first surface of the glass substrate, such as described in U.S. Pat. Nos. 7,255,541; 7,289,037; 7,360,932; 8,049,640 and/or 8,529,108, which are hereby incorporated herein by reference in their entireties. Optionally, the mirror assembly may include a conventional bezel, such as described in U.S. Pat. No. 7,224,324, which is hereby incorporated herein by reference in its entirety.

As discussed above, the mirror assembly may comprise an electro-optic or electrochromic mirror assembly that includes an electro-optic or electrochromic reflective element. The perimeter edges of the reflective element may be encased or encompassed by the perimeter element or portion of the bezel portion to conceal and contain and envelop the perimeter edges of the substrates and the perimeter seal disposed therebetween. The electrochromic mirror element of the electrochromic mirror assembly may utilize the principles disclosed in commonly assigned U.S. Pat. Nos. 7,274,501; 7,255,451; 7,195,381; 7,184,190; 6,690,268; 5,140,455; 5,151,816; 6,420,036; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, and/or International Publication No. WO 2010/114825, which are hereby incorporated herein by reference in their entireties.

The exterior rearview mirror assembly may include a casing, such as described above, or the mirror assembly may comprise or utilize aspects of other types of casings or the like, such as described in U.S. Pat. Nos. 7,338,177; 7,289,037; 7,249,860; 6,439,755; 4,826,289 and/or 6,501,387, which are all hereby incorporated herein by reference in their entireties, without affecting the scope of the present invention. For example, the mirror assembly may utilize aspects of the flush or frameless or bezelless reflective elements described in U.S. Pat. Nos. 7,626,749; 7,360,932; 7,289,037; 7,255,451; 7,274,501 and/or 7,184,190, and/or in U.S. Pat. Pub. Nos. US-2006-0061008 and/or US-2006-0050018, which are all hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. A vehicular exterior rearview mirror assembly, the vehicular exterior rearview mirror assembly comprising:
a mounting arm comprising (i) an actuator-mounting bracket, (ii) a mounting post and (iii) a base mounting portion;
wherein the base mounting portion of the mounting arm is configured for mounting the vehicular exterior rearview mirror assembly at an exterior portion of a side door of a vehicle equipped with the vehicular exterior rearview mirror assembly;
a mirror head comprising a mirror reflective element sub-assembly;
wherein the mirror reflective element sub-assembly comprises a mirror reflective element having a front side and a rear side opposite the front side, and wherein the front side is separated from the rear side by a thickness dimension of the mirror reflective element;
an electrically-operated actuator;
wherein the electrically-operated actuator comprises a first attachment element that attaches at the actuator-mounting bracket of the mounting arm and a second attachment element that attaches at the mirror head;
wherein the electrically-operated actuator comprises first and second electrically-operated motors;
wherein, when the first electrically-operated motor is electrically operated, the electrically-operated actuator causes adjustment of the mirror head relative to the mounting arm about a first pivot axis;
wherein, when the second electrically-operated motor is electrically operated, the electrically-operated actuator causes adjustment of the mirror head relative to the mounting arm about a second pivot axis;
wherein, with the vehicular exterior rearview mirror assembly mounted at the exterior portion of the side door of the equipped vehicle, electrical operation of the first and second electrically-operated motors of the electrically-operated actuator moves the mirror head to adjust a rearward view provided by the mirror reflective element of the mirror head to a driver of the equipped vehicle viewing the mirror reflective element;
wherein the mirror reflective element sub-assembly moves in tandem with movement of the mirror head when the electrical operation of the electrically-operated actuator moves the mirror head to adjust the rearward view provided by the mirror reflective element of the mirror head to the driver of the equipped vehicle viewing the mirror reflective element;
wherein the mounting post of the mounting arm passes through an opening of the mirror head, the opening providing clearance between the mirror head and the mounting arm to allow movement of the mirror head relative to the mounting arm during the electrical operation of the electrically-operated actuator when the base mounting portion of the vehicular exterior rearview mirror assembly is mounted at the exterior portion of the side door of the equipped vehicle;
wherein a seal is disposed at the opening of the mirror head to limit intrusion of water and contaminants into the mirror head, wherein the seal allows movement of the mirror head relative to the mounting arm during the electrical operation of the electrically-operated actuator when the base mounting portion of the vehicular exterior rearview mirror assembly is mounted at the exterior portion of the side door of the equipped vehicle; and
wherein engagement of the first attachment element with the second attachment element limits pivotal movement of the second attachment element about the second pivot axis.

2. The vehicular exterior rearview mirror assembly of claim 1, wherein the first attachment element comprises a partially spherical protrusion and the electrically-operated actuator has a partially spherical receiver that receives the partially spherical protrusion therein to allow for pivotal movement of the electrically-operated actuator about the second pivot axis relative to the first attachment element.

3. The vehicular exterior rearview mirror assembly of claim 1, wherein the second attachment element comprises a shaft portion that is received at an aperture of the first attachment element, and wherein engagement of a portion of the first attachment element with an outer surface of the shaft portion limits pivotal movement of the second attachment element about the second pivot axis relative to the first attachment element when the second electrically-operated motor is electrically operated.

4. The vehicular exterior rearview mirror assembly of claim 1, wherein the mirror head comprises an actuator bracket, and wherein the second attachment element is fixedly attached to the actuator bracket.

5. The vehicular exterior rearview mirror assembly of claim 4, wherein, when the first electrically-operated motor is electrically operated, the electrically-operated actuator causes pivoting of the second attachment element and the actuator bracket to adjust the mirror head relative to the mounting arm about the first pivot axis.

6. The vehicular exterior rearview mirror assembly of claim 5, wherein the electrically-operated actuator comprises an actuator housing that houses the first and second electrically-operated motors, and wherein, when the first electrically-operated motor is electrically operated, the second attachment element and the actuator bracket move relative to the actuator housing.

7. The vehicular exterior rearview mirror assembly of claim 6, wherein the actuator housing and the actuator bracket cooperate to limit pivotal movement of the actuator bracket about the first pivot axis.

8. The vehicular exterior rearview mirror assembly of claim 7, wherein the actuator bracket includes stop flanges that engage the actuator housing to limit pivotal movement of the actuator bracket relative to the actuator housing about the first pivot axis when the first electrically-operated motor is electrically operated.

9. The vehicular exterior rearview mirror assembly of claim 8, wherein a first stop flange of the stop flanges of the actuator bracket is moved toward the actuator housing when the first electrically-operated motor is electrically operated in one direction, and wherein a second stop flange of the stop flanges of the actuator bracket is moved toward the actuator housing when the first electrically-operated motor is electrically operated in the opposite direction.

10. The vehicular exterior rearview mirror assembly of claim 9, wherein a shaft portion of the second attachment element is pivotable relative to the first attachment element about the second pivot axis and is pivotable relative to the first attachment element about the first pivot axis.

11. The vehicular exterior rearview mirror assembly of claim 1, wherein the first and second electrically-operated motors are oriented so that their respective output shafts are parallel to one another.

12. The vehicular exterior rearview mirror assembly of claim 1, wherein the electrically-operated actuator is attached at the mounting arm inside the mirror head.

13. The vehicular exterior rearview mirror assembly of claim 1, wherein the first pivot axis is vertically oriented with the vehicular exterior rearview mirror assembly mounted at the exterior portion of the side door of the equipped vehicle and with the mirror head in a nominal orientation.

14. The vehicular exterior rearview mirror assembly of claim 1, wherein the second pivot axis is horizontally oriented with the vehicular exterior rearview mirror assembly mounted at the exterior portion of the side door of the equipped vehicle.

15. The vehicular exterior rearview mirror assembly of claim 14, wherein the second pivot axis extends laterally across the equipped vehicle.

16. The vehicular exterior rearview mirror assembly of claim 1, wherein the mirror reflective element comprises a glass substrate having a circumferential perimeter glass edge circumscribing a periphery of the glass substrate, the circumferential perimeter glass edge spanning a thickness dimension of the glass substrate separating a planar front surface of the glass substrate from a planar rear surface of the glass substrate, and wherein the mirror head comprises a mirror casing formed of a polymeric material, and wherein the mirror casing has a portion that circumscribes the circumferential perimeter glass edge of the glass substrate of the mirror reflective element to provide a transition from the planar front surface of the glass substrate of the mirror reflective element to an outer surface of the mirror casing without encroaching onto the planar front surface of the glass substrate of the mirror reflective element.

17. The vehicular exterior rearview mirror assembly of claim 1, wherein the first attachment element has a first stop element that engages the second attachment element to limit pivotal movement of the second attachment element about the second pivot axis relative to the first attachment element when the second electrically-operated motor is electrically operated in a first direction, and wherein the first attachment element has a second stop element that engages the second attachment element to limit pivotal movement of the second attachment element about the second pivot axis relative to the first attachment element when the second electrically-operated motor is electrically operated in a second direction that is opposite the first direction.

18. The vehicular exterior rearview mirror assembly of claim 1, wherein the seal comprises a flexible material.

19. A vehicular exterior rearview mirror assembly, the vehicular exterior rearview mirror assembly comprising:

a mounting arm comprising (i) an actuator-mounting bracket, (ii) a mounting post and (iii) a base mounting portion;

wherein the base mounting portion of the mounting arm is configured for mounting the vehicular exterior rearview mirror assembly at an exterior portion of a side door of a vehicle equipped with the vehicular exterior rearview mirror assembly;

a mirror head comprising a mirror reflective element sub-assembly and an actuator bracket;

wherein the mirror reflective element sub-assembly comprises a mirror reflective element;

wherein the mirror reflective element comprises a glass substrate having a circumferential perimeter glass edge circumscribing a periphery of the glass substrate, the circumferential perimeter glass edge spanning a thickness dimension of the glass substrate separating a planar front side of the glass substrate from a planar rear side of the glass substrate;

wherein the mirror head comprises a mirror casing formed of a polymeric material, and wherein the mirror casing has a portion that circumscribes the circumferential perimeter glass edge of the glass substrate of the mirror reflective element to provide a transition from the planar front side of the glass substrate of the mirror reflective element to an outer surface of the mirror casing without encroaching onto the planar front side of the glass substrate of the mirror reflective element;

an electrically-operated actuator;

wherein the electrically-operated actuator comprises a first attachment element that attaches at the actuator-mounting bracket of the mounting arm and a second attachment element that attaches at the actuator bracket of the mirror head;

wherein, when the electrically-operated actuator is electrically operated, the electrically-operated actuator causes adjustment of the actuator bracket and the mirror head relative to the mounting arm;

wherein, with the vehicular exterior rearview mirror assembly mounted at the exterior portion of the side door of the equipped vehicle, electrical operation of the electrically-operated actuator moves the actuator bracket and the mirror head to adjust a rearward view provided by the mirror reflective element of the mirror head to a driver of the equipped vehicle viewing the mirror reflective element;

wherein the mirror reflective element sub-assembly moves in tandem with movement of the actuator bracket and the mirror head when the electrical operation of the electrically-operated actuator moves the mirror head to adjust the rearward view provided by the mirror reflective element of the mirror head to the driver of the equipped vehicle viewing the mirror reflective element;

wherein the mounting post of the mounting arm passes through an opening of the mirror head, the opening providing clearance between the mirror head and the mounting arm to allow movement of the mirror head relative to the mounting arm during the electrical operation of the electrically-operated actuator when the base mounting portion of the vehicular exterior rearview mirror assembly is mounted at the exterior portion of the side door of the equipped vehicle; and wherein a seal is disposed at the opening of the mirror head to limit intrusion of water and contaminants into the mirror head, wherein the seal comprises a flexible material that allows movement of the mirror head relative to the mounting arm during the electrical operation of the electrically-operated actuator when the base mounting portion of the vehicular exterior rearview mirror assembly is mounted at the exterior portion of the side door of the equipped vehicle.

20. The vehicular exterior rearview mirror assembly of claim 19, wherein the first attachment element comprises a partially spherical protrusion and the electrically-operated actuator has a partially spherical receiver that receives the partially spherical protrusion therein to allow for pivotal movement of the electrically-operated actuator relative to the first attachment element.

21. The vehicular exterior rearview mirror assembly of claim 19, wherein the second attachment element comprises a shaft portion that is received at an aperture of the first attachment element.

22. The vehicular exterior rearview mirror assembly of claim 21, wherein a stop element of the first attachment element engages an outer surface of the shaft portion to limit pivotal movement of the second attachment element when the electrically-operated actuator is electrically operated.

23. The vehicular exterior rearview mirror assembly of claim 19, wherein the electrically-operated actuator comprises an actuator housing that houses electrically-operated motors of the electrically-operated actuator.

24. The vehicular exterior rearview mirror assembly of claim 23, wherein the actuator housing and the actuator bracket cooperate to limit pivotal movement of the actuator bracket.

25. The vehicular exterior rearview mirror assembly of claim 24, wherein the actuator bracket includes stop flanges that engage the actuator housing to limit pivotal movement of the actuator bracket relative to the actuator housing when the electrically-operated actuator is electrically operated.

26. The vehicular exterior rearview mirror assembly of claim 25, wherein a first stop flange of the stop flanges of the actuator bracket is moved toward the actuator housing when the electrically-operated actuator is electrically operated in one direction, and wherein a second stop flange of the stop flanges of the actuator bracket is moved toward the actuator housing when the electrically-operated actuator is electrically operated in the opposite direction.

27. The vehicular exterior rearview mirror assembly of claim 19, wherein the electrically-operated actuator is attached at the mounting arm inside the mirror head.

* * * * *